United States Patent
Gonzalez-Rivero et al.

(10) Patent No.: US 12,333,798 B2
(45) Date of Patent: Jun. 17, 2025

(54) CONVOLUTIONAL NEURAL NETWORK (CNN) FOR AUTOMATIC TARGET RECOGNITION IN A SATELLITE

(71) Applicant: Maxar Space LLC, Palo Alto, CA (US)

(72) Inventors: Manuel Gonzalez-Rivero, Alexandria, VA (US); David R. Herdzik, Ypsilanti, MI (US); Jonathan C. Harris, Ellicott City, MD (US)

(73) Assignee: Maxar Space LLC, Palo Alto, CA (US)

( * ) Notice: Subject to any disclaimer, the term of this patent is extended or adjusted under 35 U.S.C. 154(b) by 610 days.

(21) Appl. No.: 17/696,709

(22) Filed: Mar. 16, 2022

(65) Prior Publication Data
US 2023/0298341 A1    Sep. 21, 2023

(51) Int. Cl.
*G06V 20/13*    (2022.01)
*G06N 3/048*    (2023.01)
*G06T 1/60*     (2006.01)

(52) U.S. Cl.
CPC ............. *G06V 20/13* (2022.01); *G06N 3/048* (2023.01); *G06T 1/60* (2013.01)

(58) Field of Classification Search
CPC ........... G06V 20/13; G06N 3/048; G06T 1/60
See application file for complete search history.

(56) References Cited

U.S. PATENT DOCUMENTS

| | | | |
|---|---|---|---|
| 9,589,210 B1 | 3/2017 | Estrada | |
| 10,572,976 B2 | 2/2020 | Albrecht et al. | |
| 11,790,773 B2 * | 10/2023 | Brooks et al. | ......... G06V 10/82 |
| 2018/0336468 A1 * | 11/2018 | Kadav et al. | ............ G06N 3/08 |
| 2020/0074629 A1 | 3/2020 | Zur | |

(Continued)

FOREIGN PATENT DOCUMENTS

| | | | | |
|---|---|---|---|---|
| CN | 111523521 A * | 8/2020 | ........... | G06F 18/241 |
| JP | 2710536 B2 * | 2/1998 | ........... | G06F 15/173 |

(Continued)

OTHER PUBLICATIONS

Notice of Allowance dated May 8, 2024, U.S. Appl. No. 17/696,707, filed Mar. 16, 2022.

(Continued)

*Primary Examiner* — Vu Le
*Assistant Examiner* — Matthew James Bodnark
(74) *Attorney, Agent, or Firm* — Pearl Cohen Zedek Latzer Baratz LLP

(57) ABSTRACT

Methods and structures are presented for implementing an automatic target recognition system as a convolutional neural network (CNN) in a satellite or other environment with constrained resources, such as limited memory capacity and limited processing capability. For example, this allows for the automatic target recognition to be implemented on a field programmable gate array (FPGA). Image data is split into subsets of contiguous pixels, with the subsets processed in parallel in a CNN of a corresponding processing node using quantized weight values that are determined in a training process that accounts for the constraints of the automatic target recognition system. The results of the automatic target recognition process is based on the combined output of the processing nodes.

21 Claims, 14 Drawing Sheets

(56) References Cited

U.S. PATENT DOCUMENTS

| | | | |
|---|---|---|---|
| 2020/0234447 A1* | 7/2020 | Karmatha et al. | G06N 20/00 |
| 2021/0182077 A1* | 6/2021 | Chen et al. | G06F 9/445 |
| 2021/0295546 A1 | 9/2021 | He et al. | |
| 2021/0406577 A1* | 12/2021 | Ahn | G06K 9/32 |
| 2022/0269937 A1* | 8/2022 | Kim et al. | G06N 3/08 |
| 2023/0138762 A1 | 5/2023 | Lambert | |

FOREIGN PATENT DOCUMENTS

| | | |
|---|---|---|
| WO | WO2010/055992 A2 | 5/2010 |
| WO | WO2021/205424 A2 | 10/2021 |

OTHER PUBLICATIONS

English Abstract of PCT Publication No. WO2010/055992 published May 20, 2010.
U.S. Appl. No. 17/696,707, filed Mar. 16, 2022.

\* cited by examiner

CONVOLUTIONAL NEURAL NETWORK (CNN) FOR AUTOMATIC TARGET RECOGNITION IN A SATELLITE

BACKGROUND

Neural networks can be very effective at complex tasks such as image identification. However, such neural networks are computationally intensive and require significant memory usage. This makes them difficult to implement in resource limited environments. Examples of a resource limited environment are satellites, where size, mass, and complexity are all minimized. Many satellites could benefit from image identification, and automatic target recognition in particular, but accurate implementation of such systems using neural networks on a satellite is limited by the constrains placed on a satellite's resources.

DETAILED DESCRIPTION

The following presents techniques and structures for implementing a convolutional neural network (CNN) based automatic target recognition system in a hardware constrained environment, such as when there is limited memory capacity, processing capacity, or both. Although more generally application, this discussion will mainly be presented in the context of an automatic target recognition system for a satellite that can be implemented on a field programmable gate array (FPGA).

Image data from an image sensor is broken up into pixel image "chip", or pixel values of a contiguous subset of pixel locations, such as 16×16 or 32×32 regions. The data from the different image chips are each processed in a CNN of a corresponding processing node, where a broadcaster in conjunction with a micro sequencer interleaves the transmission of image data and commands to the array of processing node. The automatic target recognition result is based on the combined outputs of the processing nodes, such as through a final shared softmax or shared sigmoid layer. The size of the pixel image chips and specifics of the architecture for the automatic target recognition system are based on the hardware constraints and are taken into account when training the network to determining the CNN weight values. To reduce the computational complexity and memory requirements for weight storage, the trained weight values are quantized, rather using floating point values. Memory requirements can be further reduced by streaming the pixel image chips with little or no buffer of the image data prior to processing.

Figure 1:
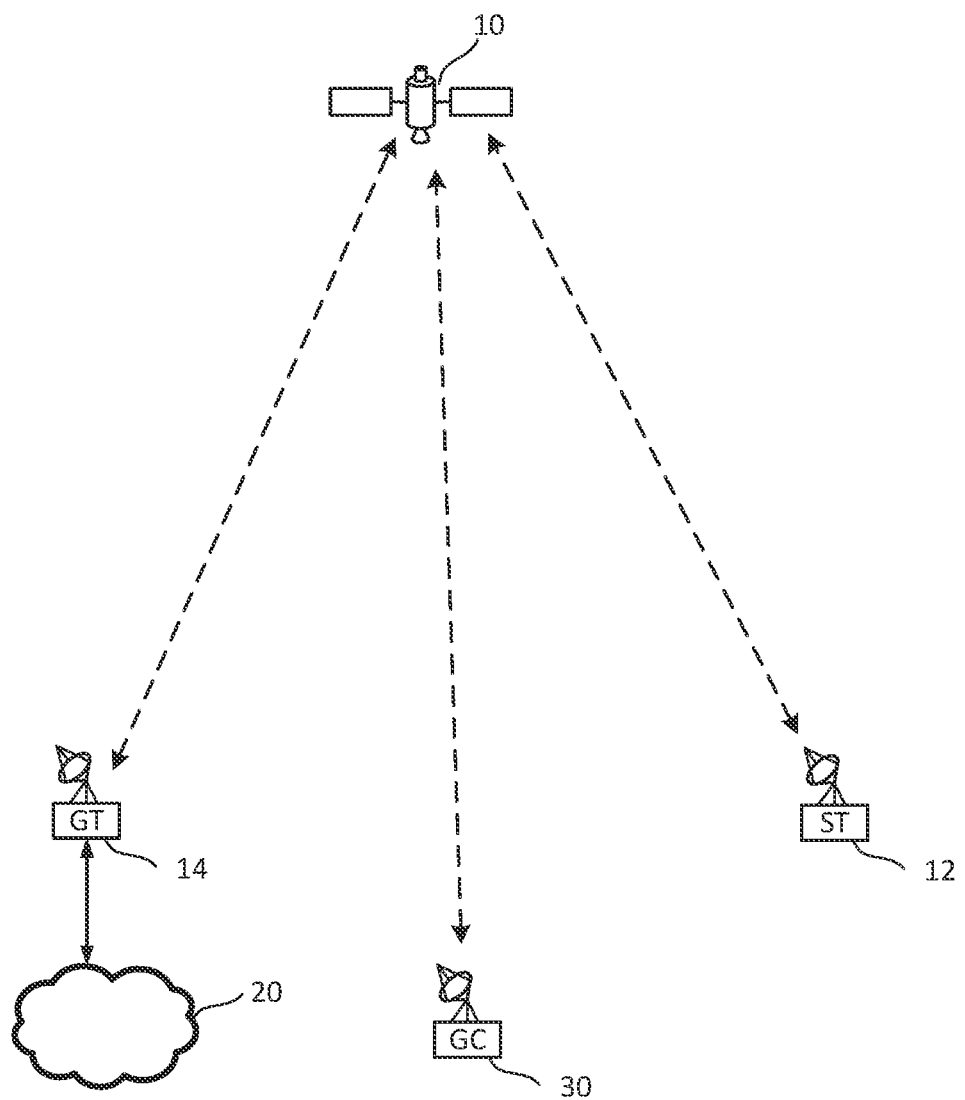
FIG. 1 is a block diagram of a spacecraft system.

FIG. 1 is a block diagram of a spacecraft system that can implement the technology proposed herein. The system of FIG. 1 includes spacecraft 10, subscriber terminal 12, gateway 14, and ground control terminal 30. Subscriber terminal 12, gateway 14, and ground control terminal 30 are examples of ground terminals. In one embodiment, spacecraft 10 is a satellite; however, spacecraft 10 can be other types of spacecrafts (e.g., shuttle, space station, inter-planet traveling craft, rocket, etc.) or even aircraft, such as drones. Spacecraft 10 may be located, for example, at a geostationary or non-geostationary orbital location. Spacecraft 10 can also be a Low Earth Orbit satellite. Spacecraft 10 is communicatively coupled by at least one wireless feeder link to at least one gateway terminal 12 and by at least one wireless user link to a plurality of subscriber terminals (e.g., subscriber terminal 12) via an antenna system. Gateway terminal 14 is connected to the Internet 20. The system allows satellite 10 to provide internet connectivity to a plurality of subscriber terminals (e.g., subscriber terminal 12) via gateway 14. Ground control terminal 30 is used to monitor and control operations of spacecraft 10. When reference is made to a specific embodiment for the spacecraft 10, the example of an imaging or optical satellite will often be used in the following, although the techniques are more widely applicable, including other or additional payloads such as for a communication satellite.

Figure 2:
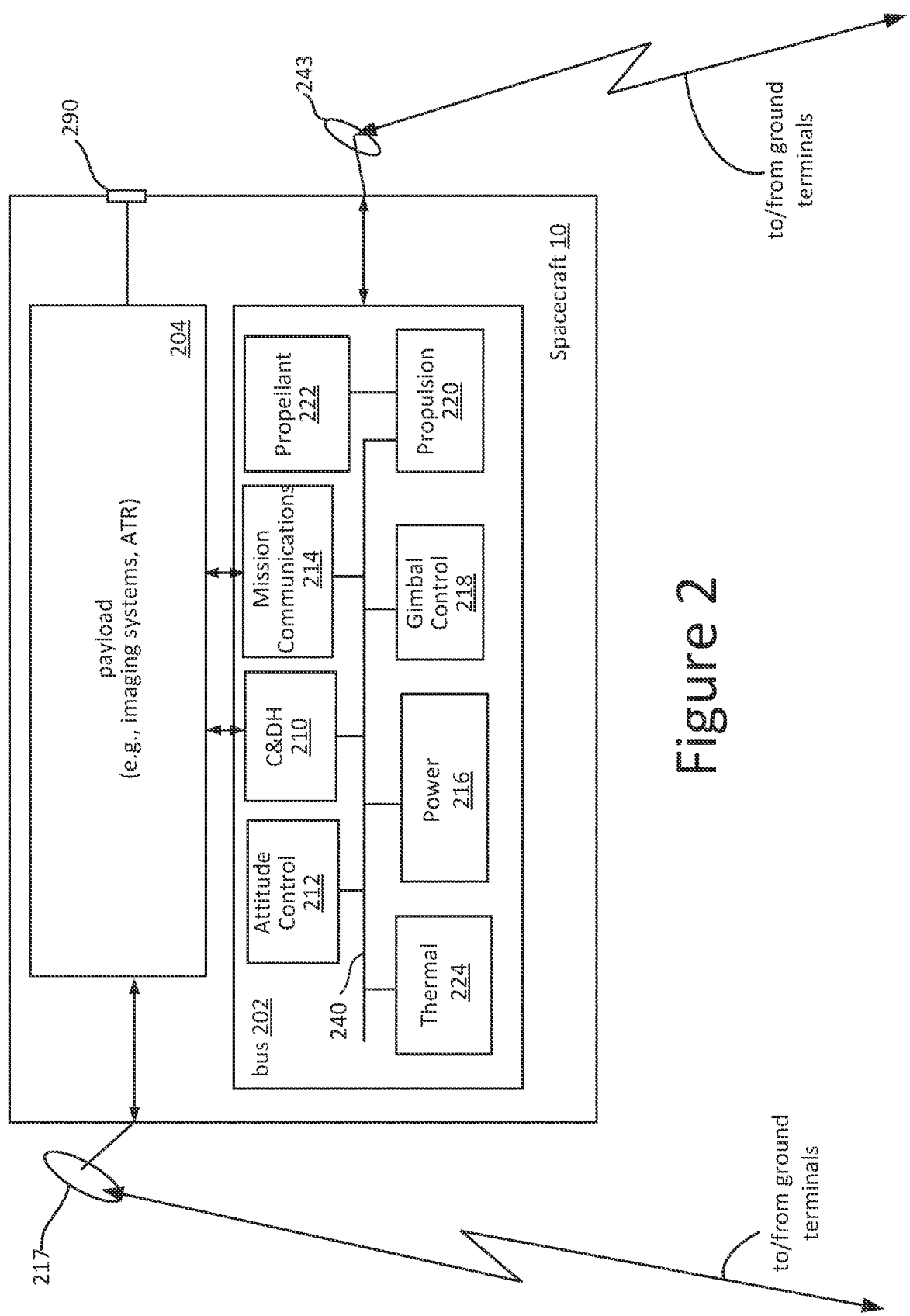
FIG. 2 is a block diagram of an example spacecraft.

FIG. 2 is a block diagram of one embodiment of spacecraft 10, which in one example (as discussed above) is a satellite, that can be a client spacecraft for an on-orbit servicing operation. In one embodiment, spacecraft 10 includes a bus 202 and a payload 204 carried by bus 202. Some embodiments of spacecraft 10 may include more than one payload. The payload provides the functionality of communication, sensors and/or processing systems needed for the mission of spacecraft 10.

In general, bus 202 is the spacecraft that houses and carries the payload 204, such as the components for operation as an imaging satellite. The bus 202 includes a number of different functional sub-systems or modules, some examples of which are shown. Each of the functional sub-systems typically include electrical systems, as well as mechanical components (e.g., servos, actuators) controlled by the electrical systems. These include a command and data handling subsystem (C&DH) 210, attitude control systems 212, mission communication systems 214, power subsystems 216, gimbal control electronics 218, a propulsion system 220 (e.g., thrusters), propellant 222 to fuel some embodiments of propulsion system 220, and thermal control subsystem 224, all of which are connected by an internal communication network 240, which can be an electrical bus (a "flight harness") or other means for electronic, optical or RF communication when the spacecraft 10 is in operation. Also represented are an antenna 243, that is one of one or more antennae used by the mission communications 214 for exchanging communications for operating of the spacecraft with ground terminals, and a payload antenna 217, that is one of one or more antennae used by the payload 204 for exchanging communications with ground terminals, such as the antennae used by a communication satellite embodiment. Other equipment can also be included: for example, imagining systems of the payload 204 may be used in conjunction with other payload systems.

The command and data handling module 210 includes any processing unit or units for handling includes command control functions for spacecraft 10, such as for attitude control functionality and orbit control functionality. The attitude control systems 212 can include devices including torque rods, wheel drive electronics, and control momentum gyro control electronics, for example, that are used to monitor and control the attitude of the space craft. Mission communication systems 214 includes wireless communication and processing equipment for receiving telemetry data/commands, other commands from the ground control terminal 30 to the spacecraft and ranging to operate the spacecraft. Processing capability within the command and data handling module 210 is used to control and operate spacecraft 10. An operator on the ground can control spacecraft 10 by sending commands via ground control terminal 30 to mission communication systems 214 to be executed by processors within command and data handling module 210. In one embodiment, command and data handling module 210 and mission communication system 214 are in communication with payload 204. In some example implementations, bus 202 includes one or more antennae as indicated at 243 connected to mission communication system 214 for wirelessly communicating between ground control terminal 30 and mission communication system 214. Power subsystems 216 can include one or more solar panels and charge storage (e.g., one or more batteries) used to provide power to spacecraft 10. Propulsion system 220 (e.g., thrusters) is used for changing the position or orientation of spacecraft 10 while in space to move into orbit, to change orbit or to move to a different location in space. The gimbal control electronics 218 can be used to move and align the antennae, solar panels, and other external extensions of the spacecraft 10.

In one embodiment, the payload 204 is for an optical system including imaging and processing capabilities, such as image recognition or automatic target recognition (ATR), and can including a lens and digital image sensor 290 to provide image data. The payload can also include an antenna system (represented by the antenna 217) that provides a set of one or more beams (e.g., spot beams) comprising a beam pattern used to receive wireless signals from ground stations and/or other spacecraft, and to send wireless signals to ground stations and/or other spacecraft. In some implementations, mission communication system 214 acts as an interface that uses the antennae of payload 204 to wirelessly communicate with ground control terminal 30.

Figure 3:
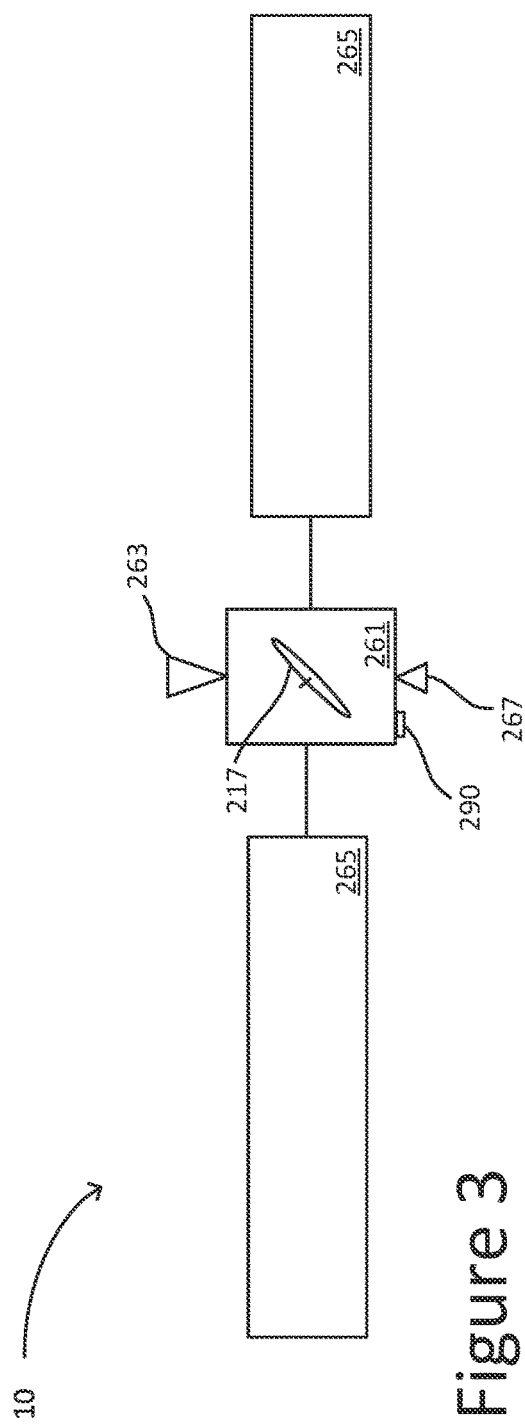
FIGS. 3 and 4 illustrate two views of a deployed spacecraft with an imaging system.
Figure 4:
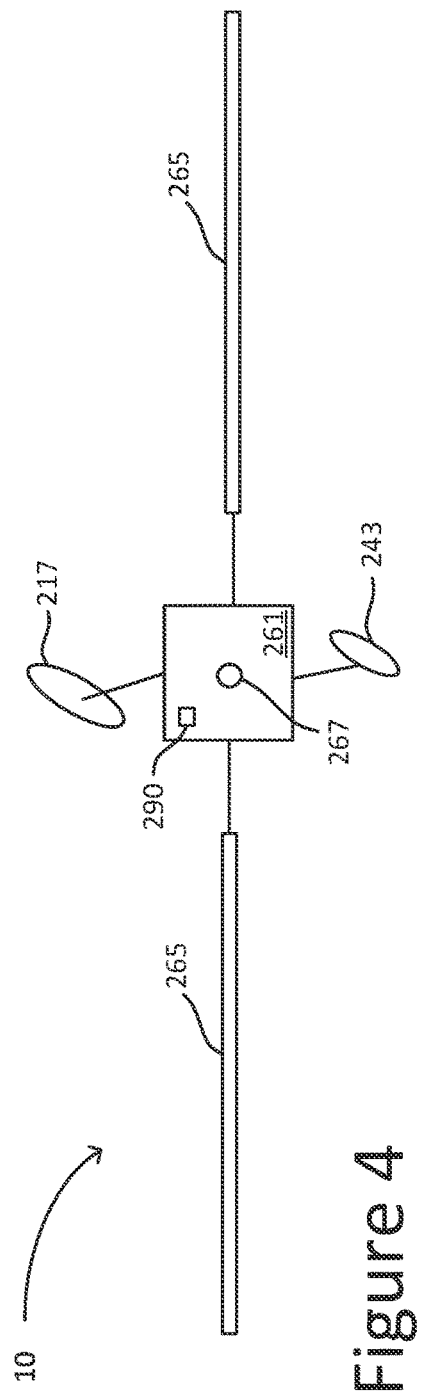

FIGS. 3 and 4 look an exterior view for an embodiment of spacecraft 10 in more detail. More specifically, FIGS. 3 and 4 show two views of an embodiment of spacecraft 10, where FIG. 4 shows the spacecraft rotated by 90° about the axis of the solar arrays 265 relative to FIG. 3. A number of different embodiments are possible, but the example of FIGS. 3 and 4 can be used to illustrate some of the elements relevant to the current discussion. The spacecraft 10 includes a spacecraft body 261 from which extend two, in this example, deployed solar arrays 265. Attached to the body will also be one or more number of antennae 217 and 243 as described above, by which the satellite can receive and transmit signals. Depending on the particulars of the embodiment, a satellite may have a large number of antennae, but only a pair of antennae for exchanging signals with a ground station are shown. Attached to the satellite body 261 are a number of thrusters, as shown at 263 and 267, which typically include one or more main thrusters and a number of attitude and orbit control thrusters. Internal to the body will be the spacecraft's frame (not show) within which the functional sub-systems can be installed.

The deployed arrays 265 can include a solar array, a thermal radiating array, or both and include one or more respectively coplanar panels. The deployed arrays 265 can be rotatable by the gimbal control 218 about the longitudinal axis (the left-right axis in FIGS. 3 and 4), in order to achieve or maintain a desired attitude with respect to, for example, the sun. For embodiments in which the deployed arrays 265 include a solar array, the solar array may be articulable so as to be substantially sun facing. The deployed solar array 265 may be sized and positioned so as to generate substantially more power from sunlight than would be possible if the solar array was fixedly disposed on the body 261 of the spacecraft 10. For example, in some implementations, the solar array orientation may be rotatable about the longitudinal axis of the spacecraft 10 so that photovoltaic power generating surfaces of the solar array remains substantially sun facing.

Figure 5:
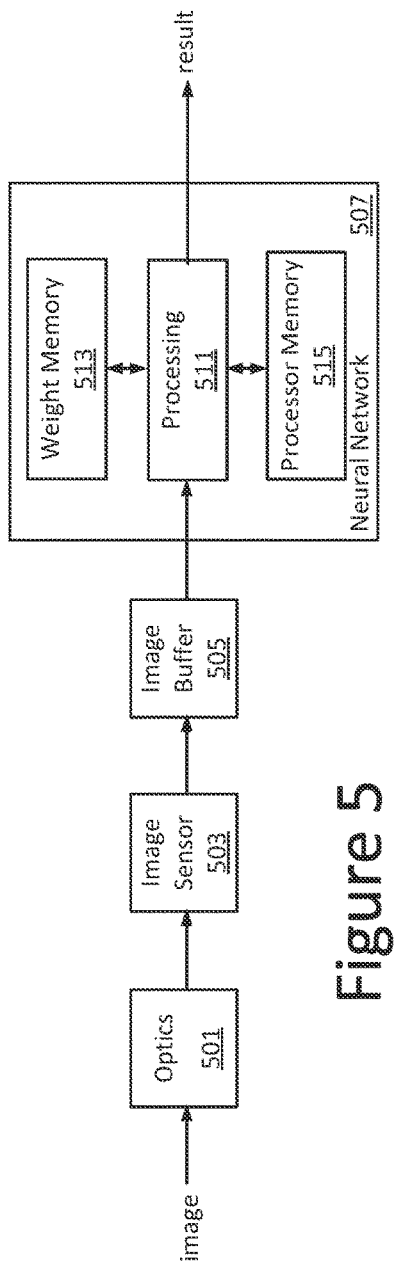
FIG. 5 illustrates one embodiment of an image recognition system, such as an automatic target recognition system.

Also represented in FIGS. 3 and 4 is an optical port of 290 located on an external surface of the spacecraft. In FIG. 3 the optical port 290 is on a downward-facing surface and on an outward facing surface in the rotated view of FIG. 4. As discussed further in the following, the optical port 290 an including lens and an image sensor, which can then provide image data to additional image processing components and automatic target recognition, or more generally, image recognition, processing, such as neural networks. FIGS. 3 and 4 show only a single optical port, but FIG. 5 illustrates one embodiment of an image recognition system, such as an automatic target recognition system. Image data is incident on the optics 501, where these optics can include lens, filters, and other optical elements used to provide the image to the image sensor 503. The lens of the optics 501 can be directed to detect and focus on an object, such as on the surface of the earth, in response to control signals received over the antenna 217 from the ground, signals generated on the spacecraft, or a combination of these. The optics 501 direct the image to be incident upon the image sensor 503, which can be a charge coupled device (CCD), CMOS, or other digital sensor type to generate a two dimensional array pixel value data for the image. Depending on the embodiment, the pixel data can be panchromatic, in an RGB format, or other color format and, in some cases, can include infra-red and ultra-violet. The pixel values can then be stored in an image buffer 505 and subsequently be processed, where, if full images are stored this can be a large number of pixel values. A number of image processing operations can be performed, depending on the application of the imaging satellite. In an automatic target recognition or other image recognition, the processing of the image data can include use of a neural network 507, such as a convolution neural network (CNN). The neural network performs convolution and other operations based upon a set of weights established in a training process. The weights can be stored in a weight memory 513 and used in a processing block 511, which can also use a processor memory 515 for its operations. In a typical implementation, the processing block 511 can include one or more processors, including central processing units (CPUs), graphics processing units (GPUs), and tensor processing units (TPUs), for example. Although represented separately, the weight memory 513 can be part of a more general processor memory 515. The operation of neural networks is discussed with respect to FIGS. 6-10.

There are a number of variations of neural networks that can be used for automatic target recognition or other image identification, where convolutional neural networks, or CNNs, are one example. The name "convolutional neural network" indicates that the network employs a mathematical operation called convolution, that is a specialized kind of linear operation. Convolutional networks are neural networks that use convolution in place of general matrix multiplication in at least one of their layers. A CNN is formed of an input and an output layer, with a number of intermediate hidden layers. The hidden layers of a CNN are typically a series of convolutional layers that "convolve" with a multiplication or other dot product.

Each neuron in a neural network computes an output value by applying a specific function to the input values coming from the receptive field in the previous layer. The function that is applied to the input values is determined by a vector of weights and a bias. Learning, in a neural network, progresses by making iterative adjustments to these biases and weights. The vector of weights and the bias are called filters and represent particular features of the input (e.g., a particular shape). A distinguishing feature of CNNs is that many neurons can share the same filter.

Figure 6:
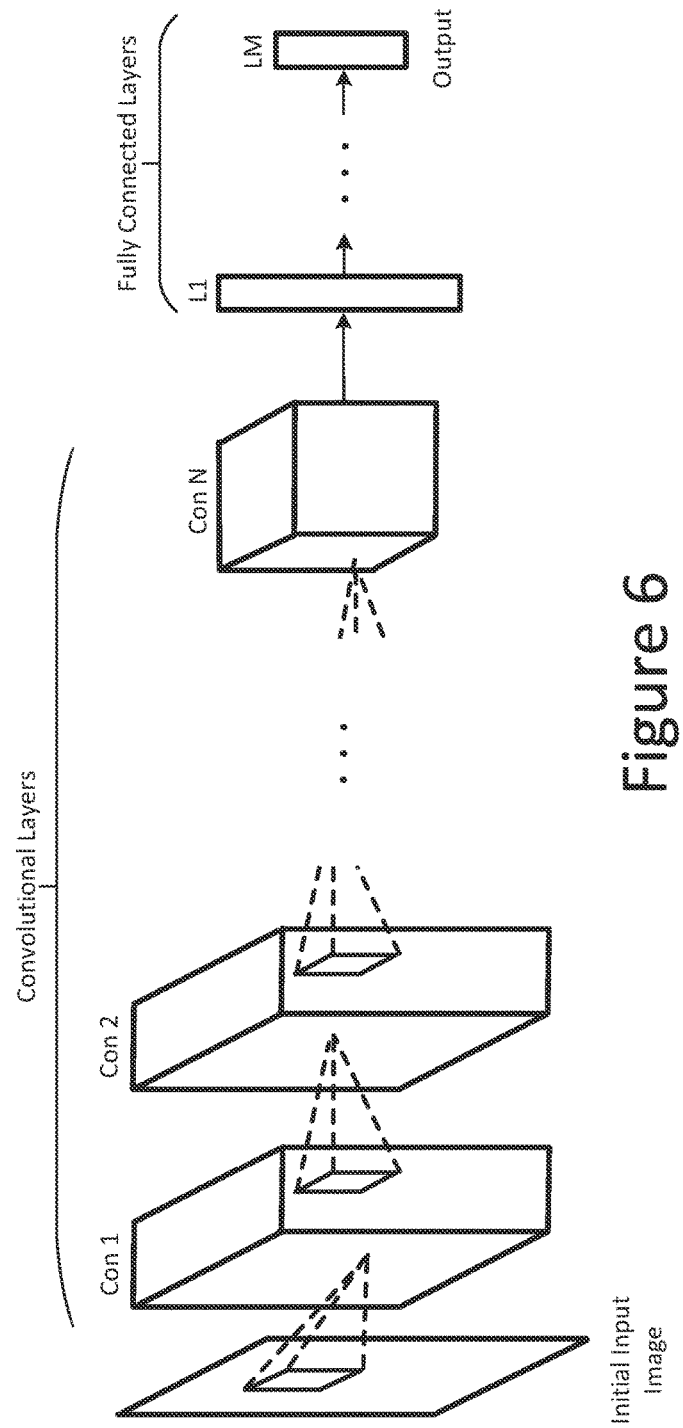
FIG. 6 illustrates a simple example of a convolutional neural network (CNN).

FIG. 6 is a schematic representation of an example of a CNN. FIG. 6 illustrates an initial input image of an array of pixel values, followed by a number of convolutional layers that are in turn followed by a number of fully connected layers, the last of which provides the output. Each neuron in the first convolutional layer (Con 1) takes as input data from an n×n pixel sub-region of the input image. The neuron's learned weights, which are collectively referred to as its convolution filter, determine the neuron's single-valued output in response to the input. In the convolutional layers, a neuron's filter is applied to the input image by sliding the input region along the image's x and y dimensions to generate the values of the convolutional layer. In practice, the equivalent convolution is normally implemented by statically identical copies of the neuron to different input regions. The process is repeated through each of the convolutional layers (Con1 to Con N) using each layer's learned weights, after which it is propagated through the fully connected layers (L1 to LM) using their learned weights.

Figure 7:
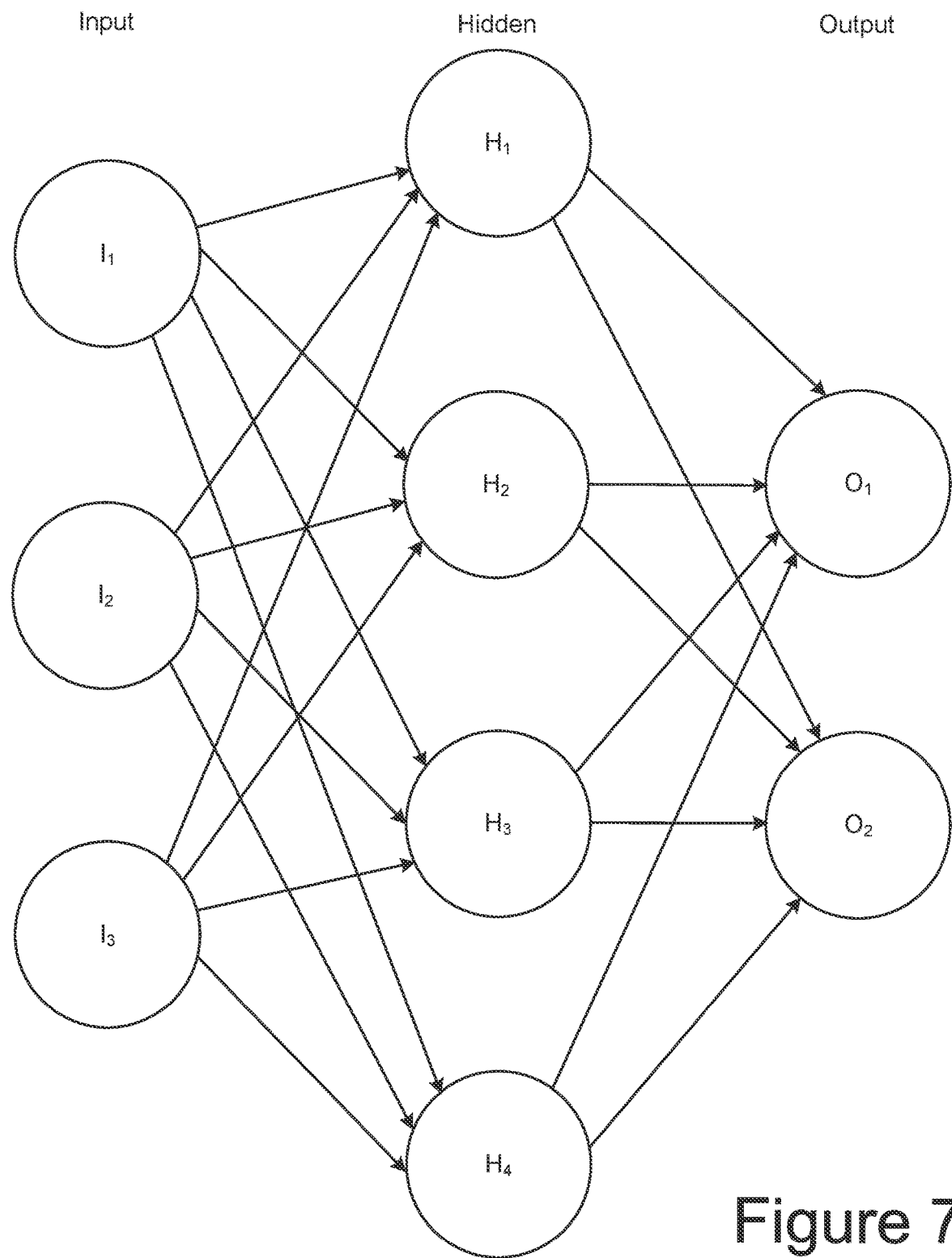
FIG. 7 illustrates a simple example of fully connected layers in an artificial neural network.

FIG. 7 represents several fully connected layers of a neural network in more detail. In FIG. 7 the shown three layers of the artificial neural network are represented as an interconnected group of nodes or artificial neurons, represented by the circles, and a set of connections (tensor connections) from the output of one artificial neuron to the input of another. The example shows three input nodes ($I_1$, $I_2$, $I_3$) and two output nodes ($O_1$, $O_2$), with an intermediate layer of four hidden or intermediate nodes ($H_1$, $H_2$, $H_3$, $H_4$). The nodes, or artificial neurons/synapses, of the artificial neural network are implemented by logic elements of a host or other processing system as a mathematical function that receives one or more inputs and sums them to produce an output. Usually, each input is separately weighted and the sum is passed through the node's mathematical function to provide the node's output.

In common artificial neural network implementations, the signal at a connection between nodes (artificial neurons/synapses) is a real number, and the output of each artificial neuron is computed by some non-linear function of the sum of its inputs. Nodes and their connections typically have a weight that adjusts as a learning process proceeds. The weight increases or decreases the strength of the signal at a connection. Nodes may have a threshold such that the signal is only sent if the aggregate signal crosses that threshold. Typically, the nodes are aggregated into layers. Different layers may perform different kinds of transformations on their inputs. Signals travel from the first layer (the input layer) to the last layer (the output layer), possibly after traversing the layers multiple times. Although FIG. 7 shows only a single intermediate or hidden layer, a complex deep neural network (DNN) can have many such intermediate layers.

A supervised artificial neural network is "trained" by supplying inputs and then checking and correcting the outputs. For example, a neural network that is trained to recognize dog breeds will process a set of images and calculate the probability that the dog in an image is a certain breed. A user can review the results and select which probabilities the network should display (above a certain threshold, etc.) and return the proposed label. Each mathematical manipulation as such is considered a layer, and complex neural networks have many layers. Due to the depth provided by a large number of intermediate or hidden layers, neural networks can model complex non-linear relationships as they are trained.

Figure 8B:
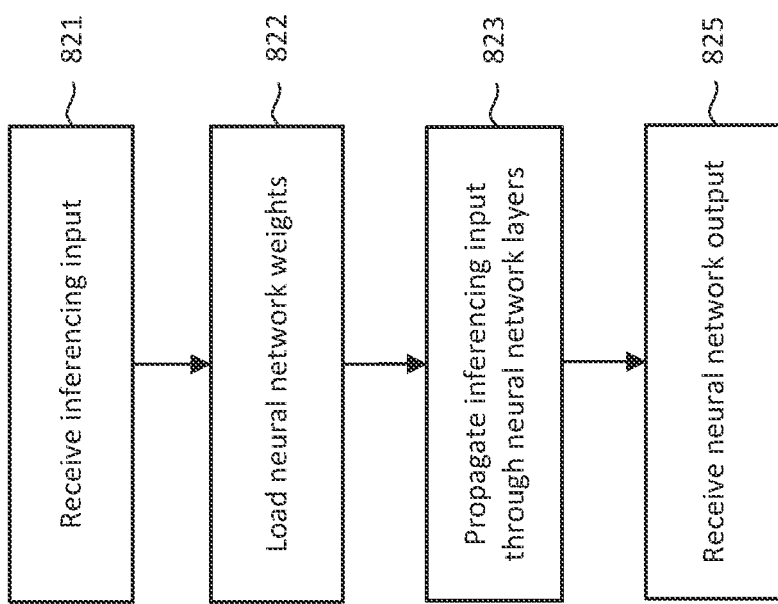
FIG. 8B is a flowchart describing one embodiment of a process for inference using a neural network.
Figure 8A:
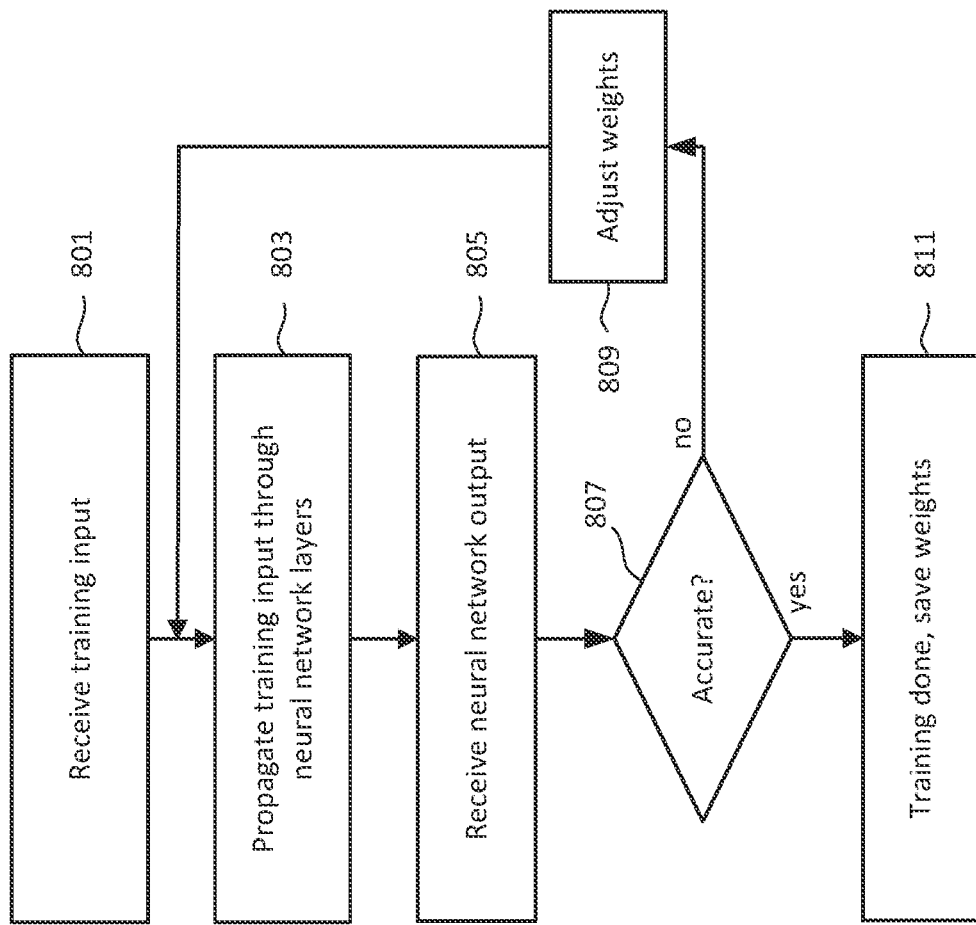
FIG. 8A is a flowchart describing one embodiment of a process for training a neural network to generate a set of weights.

FIG. 8A is a flowchart describing one embodiment of a process for training a neural network to generate a set of weights. The training process is often performed in the cloud, allowing additional or more powerful processing to be accessed. At step 801, the input, such as a set of images, is received (e.g., the image input in FIG. 6). At step 803 the input is propagated through the layers connecting the input to the next layer (e.g., CON1 in FIG. 6) using the current filter, or set of weights. The neural network's output is then received at the next layer (e.g., CON2 in FIG. 6) in step 805, so that the values received as output from one layer serve as the input to the next layer. The inputs from the first layer are propagated in this way through all of the intermediate or hidden layers until they reach the output. In the dog breed example of the preceding paragraph, the input would be the image data of a number of dogs, and the intermediate layers use the current weight values to calculate the probability that the dog in an image is a certain breed, with the proposed dog breed label returned at step 805. A user can then review the results at step 807 to select which probabilities the neural network should return and decide whether the current set of weights supply a sufficiently accurate labelling and, if so, the training is complete (step 811). If the result is not sufficiently accurate, the neural network adjusts the weights at step 809 based on the probabilities the user selected, followed by looping back to step 803 to run the input data again with the adjusted weights. Once the neural network's set of weights have been determined, they can be used to "inference," which is the process of using the determined weights to generate an output result from data input into the neural network. Once the weights are determined at step 811, they can then be stored in memory for later use.

FIG. 8B is a flowchart describing a process for the inference phase of supervised learning using a neural network to predict the "meaning" of the input data using an estimated accuracy. Depending on the case, the neural network may be inferenced both in the cloud and by an edge device's (e.g., smart phone, automobile process, hardware accelerator) processor. At step 821, the input is received, such as the image of a dog in the example used above. If the previously determined weights are not present in the device running the neural network application, they are loaded at step 822. For example, on a host processor executing the neural network, the weights could be read out of an SSD in which they are stored and loaded into RAM on the host device. At step 823, the input data is then propagated through the neural network's layers. Step 823 will be similar to step 803 of FIG. 8B, but now using the weights established at the end of the training process at step 811. After propagating the input through the intermediate layers, the output is then provided at step 825.

Figure 9:
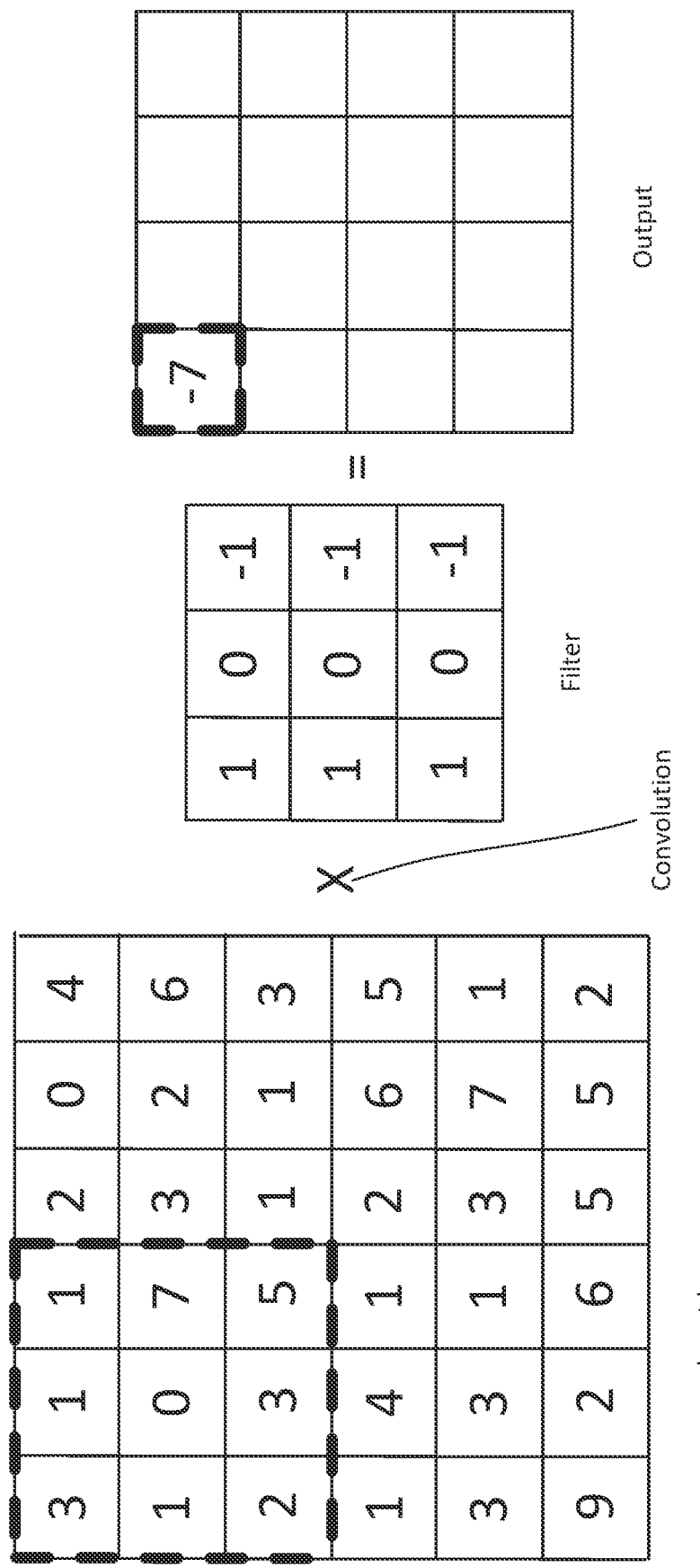
FIG. 9 is a schematic representation of a convolution operation in a convolutional neural network.

FIG. 9 is a schematic representation of a convolution operation between an input image and filter, or set of weights. In this example, the input image is a 6×6 array of pixel values and the filter is a 3×3 array of weights. The convolution operation is performed by a matrix multiplication of the 3×3 filter with 3×3 blocks of the input image. For example, the multiplication of the upper-left most 3×3 block of the image with the filter results in the top left value of the output matrix. The filter can then be slid across by one pixel on the image to generate the next entry of the output, and so on to generate a top row of 4 elements for the output. By repeating this by sliding the filter down a pixel at a time, the 4×4 output matrix is generated. Similar operations are performed for each of the layers. In a real CNN, the size of the data sets and the number of convolutions performed mean that extremely large numbers of such operations are performed involving very large amounts of data.

Figure 10:
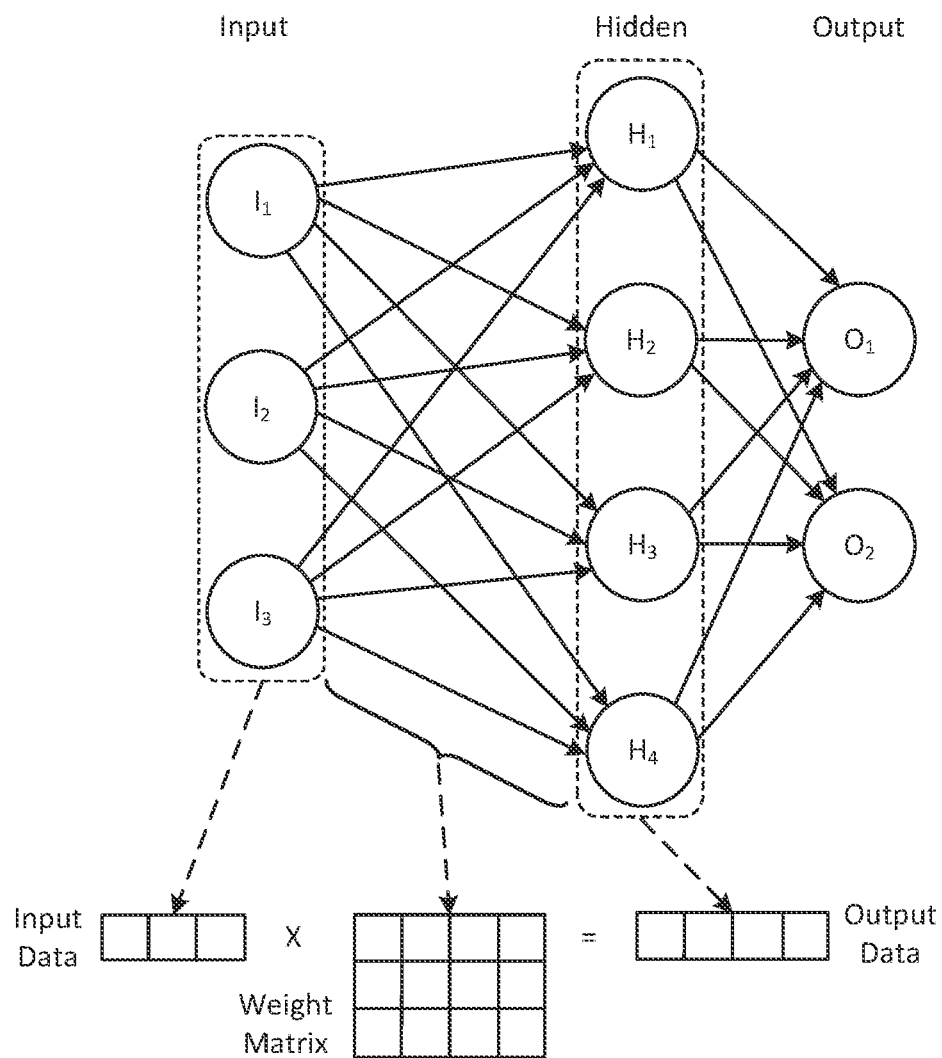
FIG. 10 is a schematic representation of the use of matrix multiplication in a fully connected layer of a neural network.

FIG. 10 is a schematic representation of the use of matrix multiplication in a fully connected layer of a neural network. Matrix multiplication, or MatMul, is a commonly used approach in both the training and inference phases for neural networks and is used in kernel methods for machine learning. FIG. 10 at the top is similar to FIG. 7, where only a single hidden layer is shown between the input layer and the output layer. The input data is represented as a vector of a length corresponding to the number of input nodes. The weights are represented in a weight matrix, where the number of columns corresponds to the number of intermediate nodes in the hidden layer and the number of rows corresponds to the number of input nodes. The output is determined by a matrix multiplication of the input vector and the weight matrix, where each element of the output vector is a dot product of the multiple component vector of the input data with a column of the weight matrix.

A common technique for executing the matrix multiplications is by use of a multiplier-accumulator (MAC, or MAC unit). However, this has a number of issues. Referring back to FIG. 8B, the inference phase loads the neural network weights at step 822 before the matrix multiplications are performed by the propagation at step 823. However, the amount of data involved can be extremely large. For example, an image sensor may provide several megapixels (millions of pixels) of data, resulting in extremely large numbers of weights in each layer of a neural network, and convolutions neural networks can be very "deep" by having large numbers of layers in deep neural networks (DNNs). Consequently, a typical implementation of multiplier-accumulator for inferencing has several issues related to implementation in situations with one or both of limited memory and limited processing capabilities, such as on a satellite where mass, required space, and redundancy are all important considerations.

To address these limitations, the following presents embodiments for implementing neural networks for automatic target recognition in a computing and/or memory restricted embodiment. The image data is broken up in smaller image "chips", such as breaking up the data from a multi-mega two-dimensional array pixel sensor values into subsets of multiple contiguous pixel location values for the image chips, such as, for example, square 16×16 or 32×32 pixel chips which are processed in parallel in different neural network pipelines, with the results combined for output of the inference operation. Although the following discussion is presented in the context of automatic target recognition performed by a satellite, the techniques can be more generally applied to other image recognition operation in other constrained situations.

Figure 11:
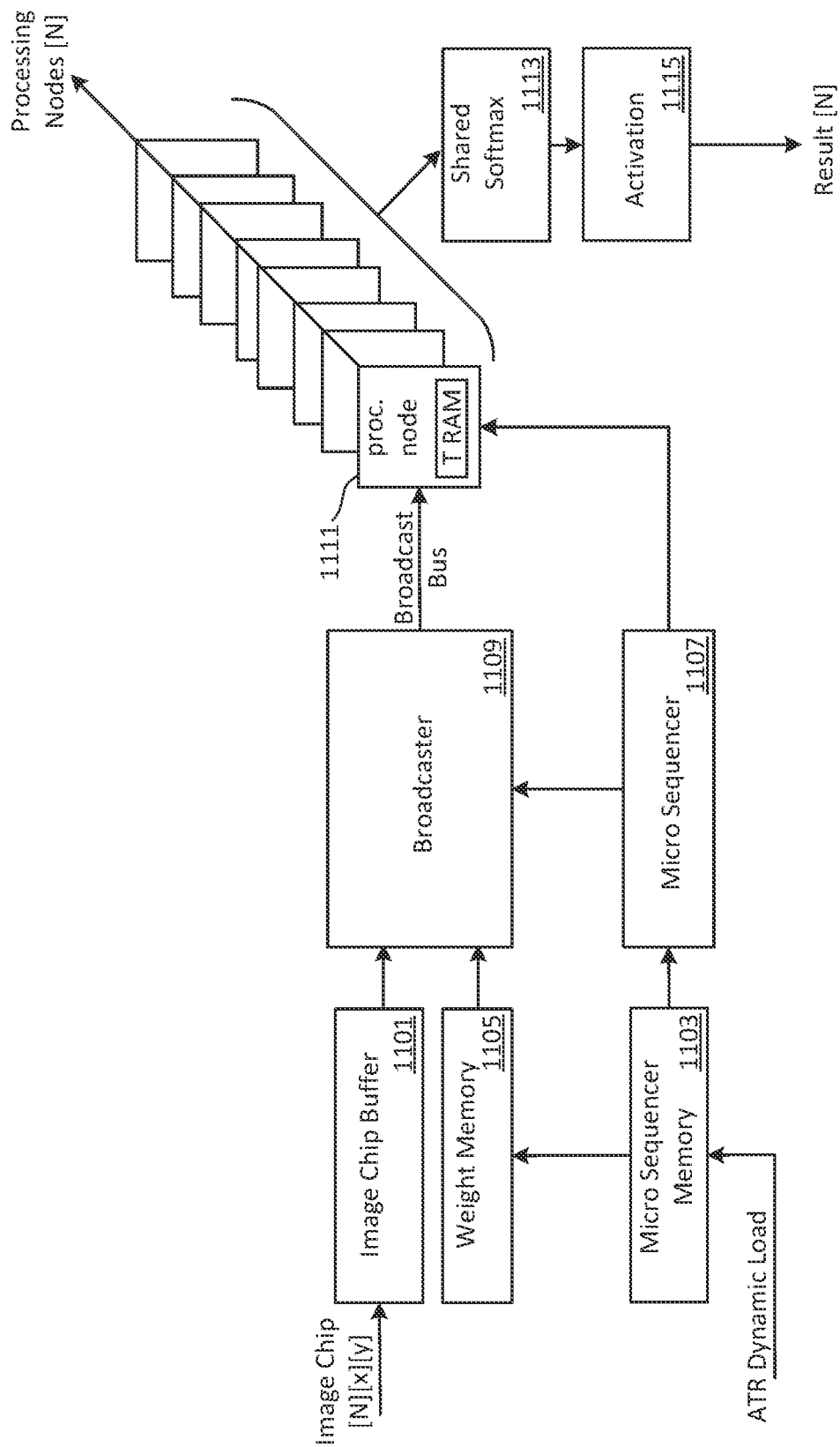
FIG. 11 is a block diagram illustrating an embodiment of the hardware architecture for implementing a CNN for automatic target recognition in a resource constrained environment.

FIG. 11 is a block diagram illustrating an embodiment of the hardware architecture for implementing a CNN for automatic target recognition in a resource constrained environment. In one set of embodiments, the circuitry of the automatic target recognition is implemented as a Field Programmable Gate Array (FPGA). The initial image from the image sensor 503 is split up into N non-overlapping image chips, such as 16×16 or 32×32 pixels, where [x] and [y] are the coordinates of a given image chip, that can then be stored in the image chip buffer 1101, and where the pixel image chip data can be collected in a raster scan format. To further reduce the memory requirements, the image chips can be streamed with little or no buffering, so that the requirements for the image chip buffer can be minimized or eliminated. The weights for the neural network are stored in the weight memory 1105. A broadcaster 1109 can then supply the N sets of weights and image chip input data to the processing nodes 1111, where in this example the number of nodes is N to maximize parallelism, but in some cases there may additionally, unused processing nodes or, in alternate embodiments with less processing nodes, some degree of serial processing could be used. The N processing nodes 1111 use a shared softmax 1113 and sigmoid or other activation 1115 in this embodiment. The network is under the control of a micro sequencer 1107 with memory 1103. (Although illustrated as separate blocks in the representation of FIG. 11, the weight memory 1105 and micro sequencer memory 1103 may be combined into a single memory.) In some embodiments, weight values and other automatic target recognition data and instructions can be dynamically loaded by way of the micro sequencer memory. For example, while on-orbit the satellite 10 may receive weight values (or updated weight values) or instructions for configuring (or reconfiguring) the ATR through the antenna 217, which can then be dynamically loaded to the ATR system.

In the embodiment of FIG. 11, the automatic target recognition CNN is implemented using a batch parallel architecture where a batch of N image chips (e.g., of size x*y) are processed in parallel using a series of single instructions broadcast to the processing array (Single Instruction Multiple Data (SIMD)) of the processing nodes 1111. In one set of embodiments, the architecture of FIG. 11 is implemented on a field programmable gate array. Performance is achieved by maximizing the number N of processing nodes 1111 and minimizing the number of instructions (the size of the CNN). For programs that have a significant number of calculations compared to the amount of Input Output (IO), the SIMD architecture achieves near linear speedup for a linear increase in N. This means performance of the implementation is not required to exploit parallelism internal to a given CNN, and the CNN is decomposed into a fully sequential implementation by unrolling all loops within the algorithm and only the overall size of the CNN (number of computations) affects performance. For the resulting architecture in the embodiment of FIG. 11, performance critical blocks are the instruction broadcaster 1109 and the processing nodes 1111.

The instruction broadcaster 1109 constructs instructions for the processing array of nodes 1111. Performance is achieved when instructions can be presented to the array every clock cycle and each individual processing node 1111 can execute the instruction within the same clock. For the processing nodes 1111, the total number of nodes drives performance, therefore keeping the nodes small is important and minimizing their IO enables creation of large arrays operating at high clock frequencies. The micro sequencer block 1107 works in conjunction with the broadcaster 1109 to handle interleaving image pixel input with instruction broadcasting. The instruction decoding can avoid duplication of weight storage for the CNN program by keeping a single copy and merging them into the broadcast instruction when appropriate. Within each processing node 1111 a local temporary value memory, T RAM, is included. The size of the T RAM memory will place a limit on the size and organization of the CNN that the array can implement. Depending on the implementation, the results output from the CNN are either a small set destined for a softmax operation 1113 or a single value targeting a sigmoid of other activation 1115. The throughput requirements of the softmax 1113 and sigmoid 1115 are relatively insignificant compared to the input pixels and overall time spent in computation that a single implementation can be shared even for very large arrays.

Each of the processing nodes 1111 can be implemented using Reduced Instruction Set Computer (RISC) techniques, namely a simple instruction set, heavy use of pipelining, and compiler handing of data hazards. The "Reduced" approach to the instruction set can be maximized with the hardware of the processing node 1111 by only implementing instructions that enable the CNN layers of: Convolution, Max Pooling, and Averaging using quantized weight values, such as 8-bit values, since floating point arithmetic is very expensive when implemented in digital logic and would quickly consume all the FPGA resources.

For example, the CNN layers supported within the FPGAs of the processing nodes in one embodiment can be:

| |
|---|
| Convolution |
| Max Pooling |
| Average |
| Rectilinear Up |
| SoftMax |
| Sigmoid |

Figure 12:
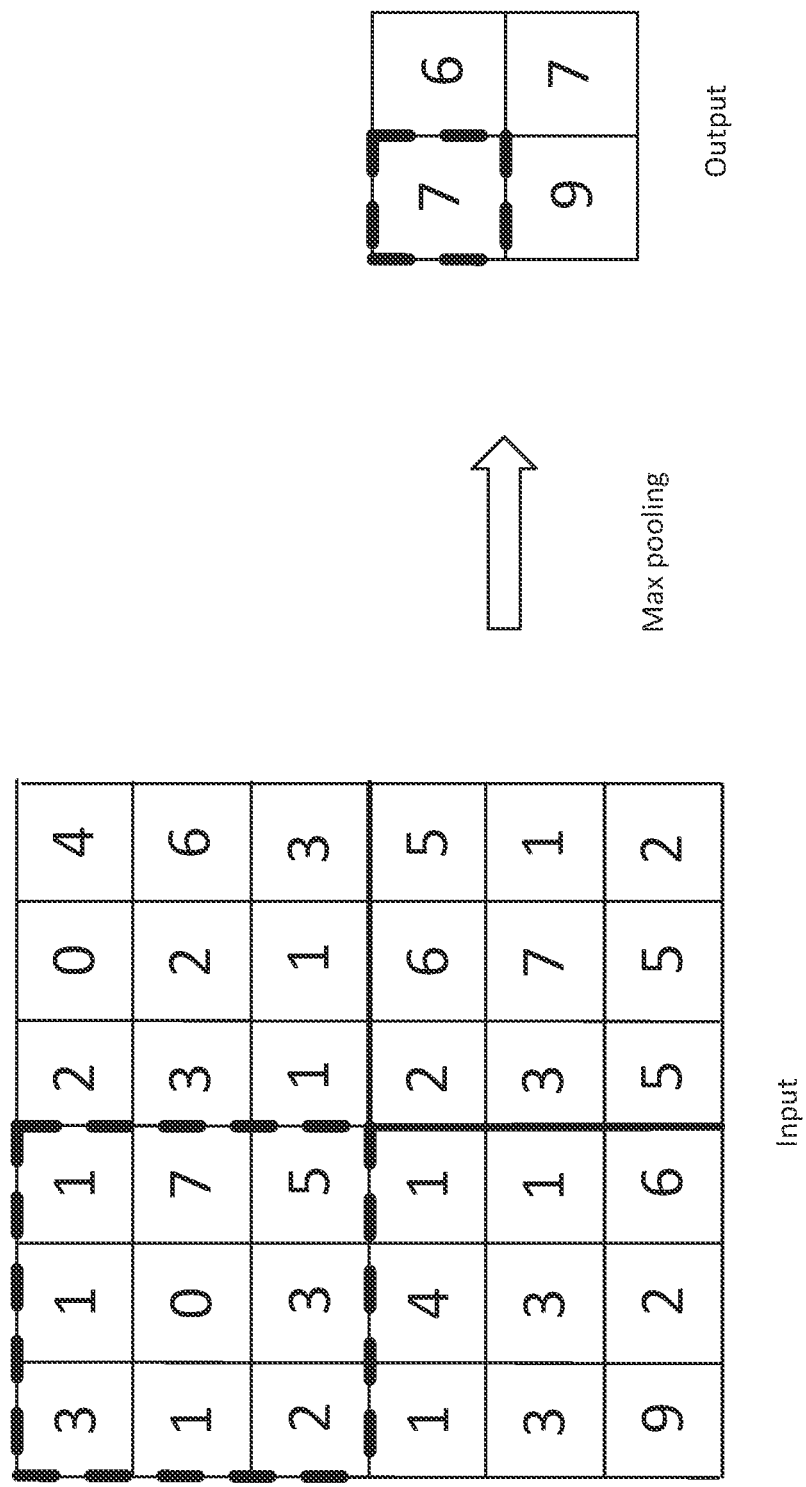
FIG. 12 is a schematic representation of a max pooling operation in a convolutional neural network.

Convolution has been described above with respect to FIG. 9 and Max Pooling can illustrated with respect to FIG. 12.

FIG. 12 is a schematic representation of a max pooling operation in a convolutional neural network using the same example of layer input as in FIG. 9. In a max pooling operation, subsets of the input values are pooled, and the maximum value with each of the pools is the output. In this example, the 6×6 input is broken into four 3×3 pools, corresponding to the quadrants of the input. Within each pool, the maximum is then determined. For example, looking at the 3×3 block of the upper left pool, that maximum value is a 7. Note that the max pooling operation reduces the size of the output relative to the size of the input by size of the pools. Considering the other layers in the table above, averaging is similar to max pooling, but instead of determining the maximum an average is determined. A rectilinear up (ReLU), or rectified linear unit, is a variety of activation function that removes negative values by setting them to zero. SoftMax and sigmoid are types of non-linear activation functions commonly used as final or late stages of neural networks to determine the result of the inferencing operation. To take one embodiment of the layers implanted on the processing nodes 1111, an initial convolution layer receiving the image chip could be followed by an alternating series of a max pooling layer and one or more convolution layers, followed by an averaging layer, a convolution layer, and a sigmoid activation. As discussed below, the specifics of the layers can be determined based on the application.

Figure 13:
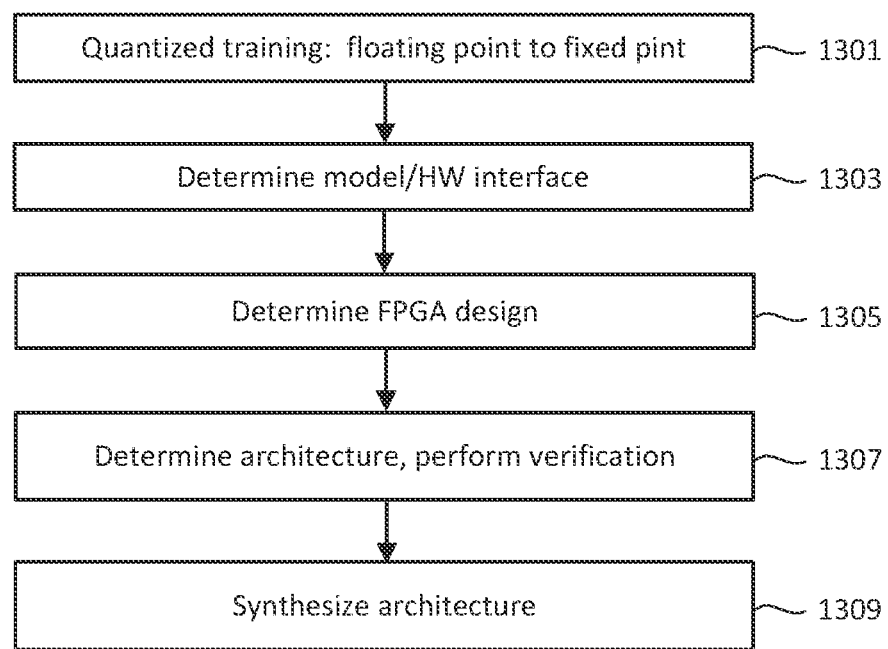
FIG. 13 is a high level flow chart of an embodiment for modelling the neural network to be used in an automatic target recognition process.

FIG. 13 is a high level flow chart of an embodiment for modelling the neural network that be used in an automatic target recognition process within the system described above. Beginning at step 1301, a quantized training operation is performed, followed by determination of a model/hardware interface at step 1303. At step 1305, a deign can be built from the interface definition, such as an FPGA design in the example embodiment used in this discussion. An architecture is determined, such as in VHDL (VHSIC Hardware Description Language) or other high-level (HDL) hardware description language, and verification is performed at step 1307. The hardware is then synthesized at step 1309, such as the configuring of an FPGA.

Considering these processes further, the CNN can be constructed and trained using optical sensor data representative of what would be received on the spacecraft. The CNN is constructed based upon which CNN layer operations and connectivity could be supported by, and those that would significantly impact the performance of, the hardware restrictions of satellite. For example, in an FPGA based CNN implementation, the FPGAs may have a very limited on device memory to hold weights and temporary values, and may lack connection to additional DRAM or other additional memory. This requirement leads to a minimization in CNN complexity and for the minimization of the number of bits used for the data representations of the weights to use as few bits as possible. For example, the use of floating point values could overwhelm the hardware implementation, so that integer arithmetic is used.

These restrictions also limit the size of image chips into which the image data is broken down to computed in parallel. In some embodiments, a 32×32 may be used, but in some embodiments the weight memory storage and computational complexity for the 32×32 image chip may still exceeded the hardware capabilities. Based on this, the main example discussed below trim the image chip size to 16×16 and pruning some layers of the CNN to reduce its overall depth. As noted above, the supported CNN layers can include convolution, max pooling, averaging, rectilinear up, softmax, and sigmoid, where no restriction is placed on the configurations of the layers. For example, convolution can employ padding, stride, any kernel size and arbitrary filter counts on any size three-dimensional data vector. Batch normalization with scaling can be included in the CNN during training, but the trained weights for the two layers would be folded into a convolution that feeds them before quantizing and exporting the trained CNN to the satellite. During import of the trained CNN to an FPGA embodiment, for example, the FPGA tools can map any batch norm or scaling layers to passthroughs since it expects the folding optimizations to have been performed.

With respect to data representation, the CNN training can use floating point arithmetic to support a high level of precision for training to converge; however, floating point data is very expensive when implemented in digital logic and would quickly consume all the FPGA resources. Therefore, a quantized representation can be used, such as an 8-bit quantization embodiment. In one set of embodiments, the inputs to the CNN and inter-layer connections are unsigned 8-bit values (i.e., the number range 0–+255). The trained weights are also 8-bit, but allowed to be signed (i.e., the number range −128–+127). Using unsigned values for tensors essentially adds an implied Rectilinear Up (ReLU) operation at the output of all CNN layers, since any negative results produced internal to the layer underflow the unsigned representation and clamp to 0.

With respect to quantization, during training quantization restrictions are accounted for as part of a quantization aware training operation. Inside convolution layers, weight values can be periodically clamped to an 8-bit representation by either using a data type with similar characteristics (e.g., float16) or the values are quantized and then unquantized, overwriting the original weight value. The resultant weights when training convergences are optimized for direct quantization. For example, the quantization format used for the weights can be:

$$w\_float = scale\_float * w\_signed8bit + 0.$$

In the above, the Y-intercept in the quantization formula is forces to 0, which simplifies the arithmetic required on the results of a multiply and accumulate (MAC) sequence, such as used in performing convolution calculations. When quantizing the trained weights for export to FPGA tools, the weights can be examined for the maximum of the absolute values and the scale_float is selected such that the range of values is covered with the available 256 values in the signed representation. The w_signed8bit weights are then easily calculated using the given equation.

For the tensor connections between CNN layers, as there is not a collection of constants (e.g., trained weights) to determine the scale_float value, the training process can either keep a histogram of the range of values for each tensor or run the collection of test and training data through the CNN once trained and collect the maximum absolute values the tensors must represent and include the corresponding scale_float in the network description. The determined scales factor for each set of tensor connection values can then be used to rescale layer internal accumulated values prior to casting them back to 8 bits.

One exception to the 0 Y-intercept is for the set of tensor values that feed the shared sigmoid 1115 or softmax 1113, which can have a non-zero Y-intercept to fully utilize the output operations. Calculating the quantization values in this case simply finds a Y-intercept that optimizes the range of values to be represented with the scale_float value. No arithmetic complexity is incurred for this special tensor since the implementation of the sigmoid and softmax do not use multiply accumulate sequences for their computations.

Once the quantization aware training is complete and quantization is performed, the custom hand off text files are created to begin, in a FPGA based embodiment the FPGA tool flow. Two files are present, a text file capturing the CNN data flow and a file (e.g., a JSON formatted file) with a dictionary of the trained weight values.

The CNN structure, in terms of number, type, and arrangement of layers, is selected so that it can fit with the available hardware, such as an FPGA in this embodiment, and achieve the desired pixel rate for a single segment of the optical sensor input data. In one set of embodiments, each of the network structure used by the N processing nodes 1111 can be a series one or more convolutional layers alternating with max pooling layers followed by an averaging and a convolutional layer, after which the individual outputs go the shared softmax 1113 and/or sigmoid or other activation 1115. As with the size of the pixel image chip, the structure of the CNN for the processing nodes is based on the available hardware capability (i.e., available memory capacity, processing ability), such as in the example embodiment of a 16×16 pixel image chip. The imaging systems of the satellite can be operated in a pan-chromatic mode, so that the pixel values could be duplicated across the processing node for, for example, 3 color dimensions. Each 16×16 image chip can transmitted to the CNN once, with internal references to the other color dimensions aliased to the one input.

Figure 14:
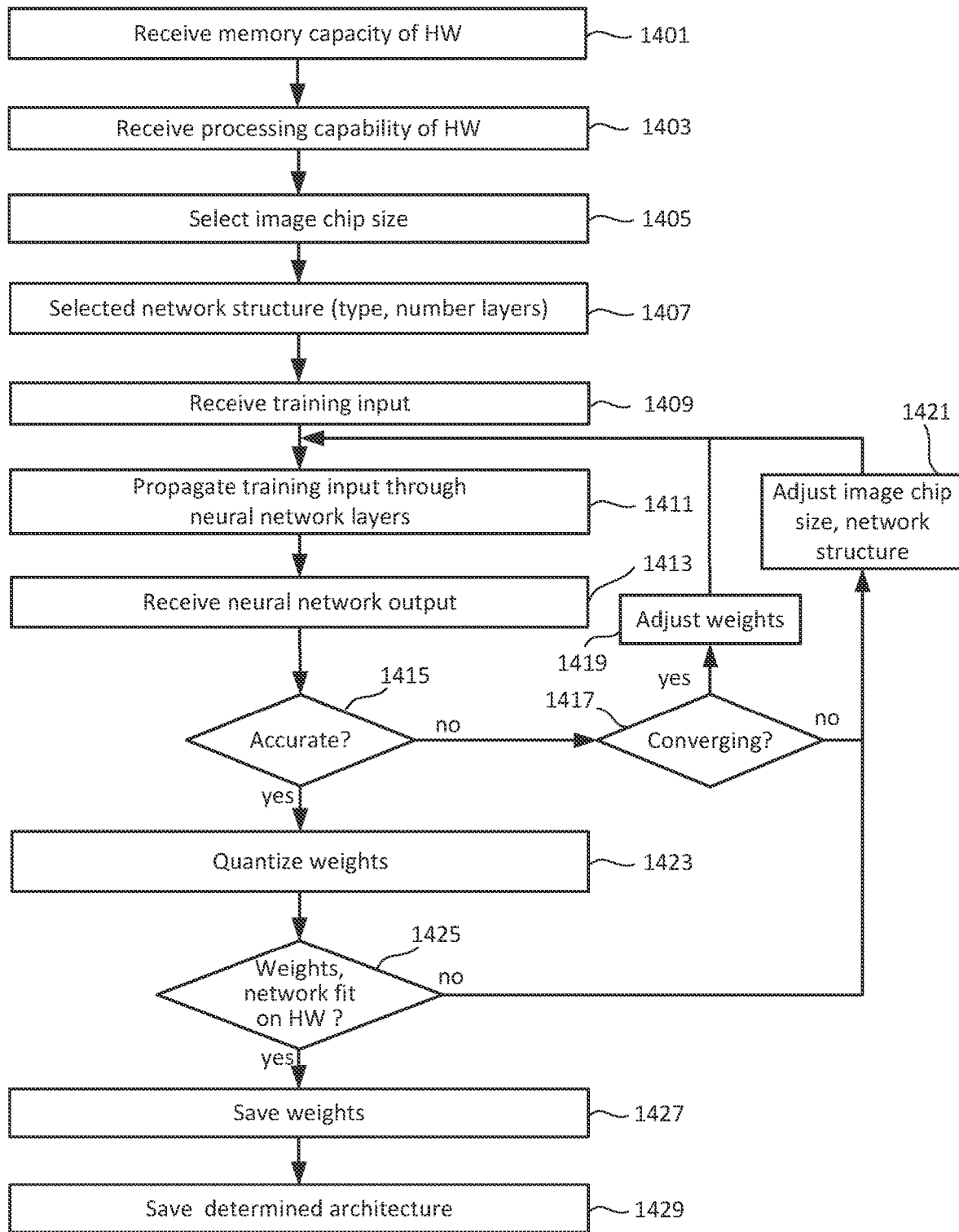
FIG. 14 is a flowchart of an embodiment of a quantization aware network training process that includes a determination of pixel image chip size and network configuration.

FIG. 14 is a flowchart of an embodiment of a quantization aware network training process that includes a determination of pixel image chip size and network configuration. The process begins with receiving information on the capabilities of the hardware on which the automatic target recognition CNN will be implemented, such as received memory capacity at step 1401 and process capability at step 1403. One or both of these may be limiting, such as in the case of the FPGA embodiment that is used as an example here. The values may be known, such as from the provider of the FPGA, or may be determined if not previously known. Based on these restrictions, an image chip size is determined at step 1405, which in turn determines the number N of pixel image chips and processing nodes, and a network structure, such as the number, type, and arrangement of layers, is determined at step 1407.

Once the image chip size and the structure of the CNN for the processing nodes 1111 are determined, the networks are trained. This training process can be performed in floating point and largely as described above with respect to FIGS. 5 and 8A and performed using various combinations of software, firmware and hardware including CPUs, GPUs, and TPUs, for example. Although the hardware performing the training will typically not be subject to the restrictions for the automatic target recognition system of FIG. 11 that will implement the trained network, the training is performed taking these limitation into account when determining the weight values. Consequently, steps 1409, 1411, 1413, 1415, and 1419 can be performed as described with respect to steps 801, 803, 805, 807, and 809 of FIG. 8A, but with the process being aware of the constraints of steps 1405 and 1407.

Relative to the flow of FIG. 8A, in some embodiments for FIG. 14 the loop through step 1419 adds an additional determination related to the determinations of steps 1405 and 1407 based on the restrictions of steps 1401 and 1403. If step 1415 finds that the weight values are not sufficiently accurate, they can also be check at step 1417 to see whether they appear to be converging to accurate values. For example, after some number loops from step 1415 through step 1419 back to step 1411, step 1417 can make a determination of whether the process is converging on an accurate set of weight values. This could be based, for example, on the number of interactions or whether weight values are not tending toward a stable set of values or are doing so only very slowly. If they do seem to be converging, or it is too early to make the determination, the loop can continue on to step 1419. If the training process does not appear to be converging, or is doing so too slowly, step 1417 instead goes to step 1421, where one or both of the image chip size and the network structure can be changed from the values set at steps 1405 and 1407. This will result in a corresponding change in the number of pixel image chips and processing nodes from N to an updated value N'. For example, the pixel image chip size could be increased from 16×16 to 20×20 or 24×24, or more layers could be added to the CNN. Once the pixel image chip size and/network structure are adjusted at step 1421, the flow loops back to step 1411 for training with the new parameters.

If the weight values are determined to be accurate at step 1415, at step 1423 they are quantized as described above. For example, the weight values can be quantized to signed 8-bit values, but bias values can use the full precision floating point representations. The reason for this is the bias value is added to the summation result of multiplying convolution input values that are quantized by a scale factor that is different from the scale factor the weights are quantized by leaving the bias to be added to a value that is in its own quantization scale representation with equals the product of the input and the weight scale factors. At step 1425, a determination can be made on whether the quantized weight values for the determined network structure will fit within the hardware's available memory capacity. If not, the flow can loop back to step 1421 and adjust one or both the image chip size to better fit the available resources. For example, in response a "no" at step 1425, the pixel image chip size could be reduced at step 1425, with the flow looping back to step 1411. In some embodiment, even though the accurate weight values may be compatible with the hardware capabilities, a decision could be made to attempt to further reduce the pixel image chip size, for example, to see whether memory requirements could be further reduced. Or conversely, a determination could be made that, if there is still sufficient memory available, the pixel image chip size could be increased and/or the network configuration changed to use remaining space to further improve accuracy. In any case, once a set of accurate quantized weights are determined, at step 1427 these are saved. As the process also determines a hardware model, the determined architecture, such as described in VHDL can also be saved at step 1429.

Figure 15:
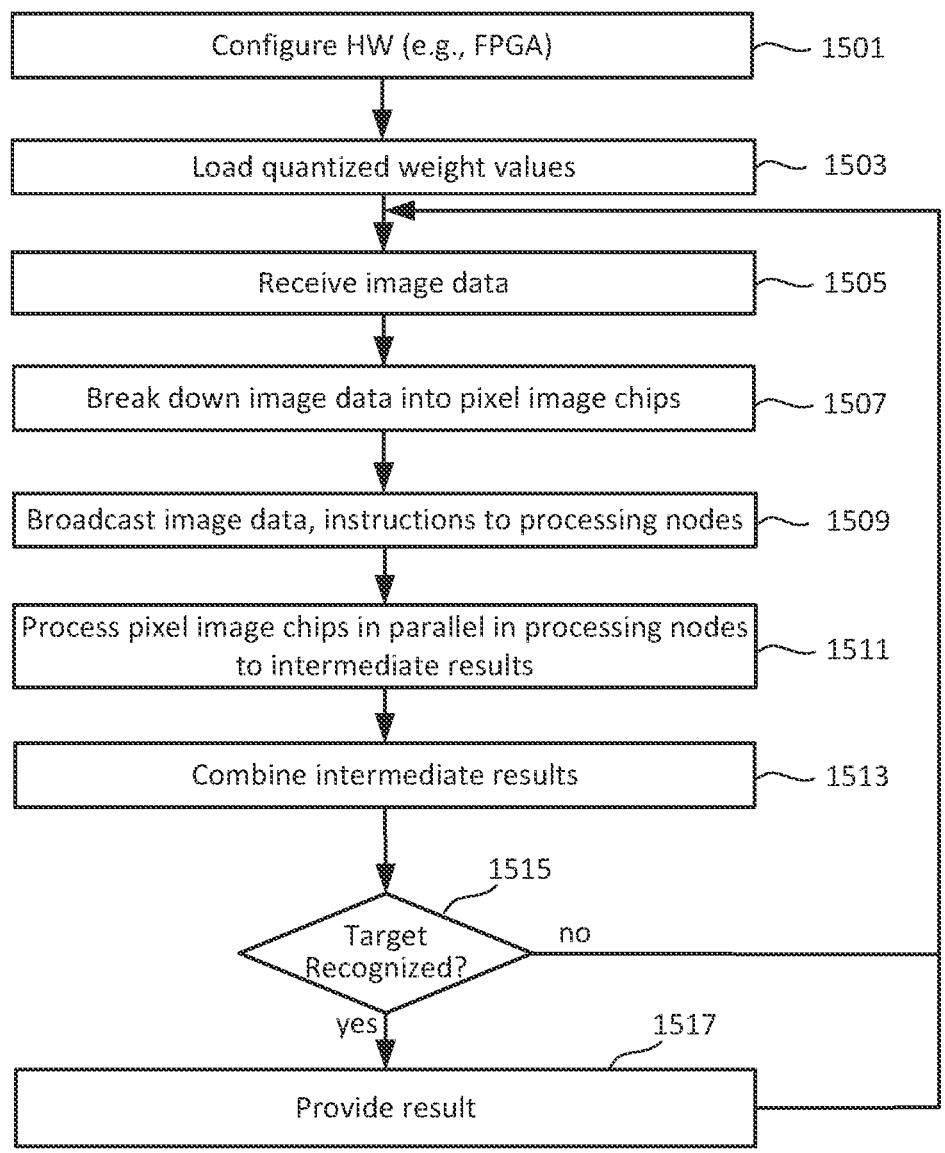
FIG. 15 is a flowchart of an embodiment for the operation of an automatic target recognition process performed on a satellite or similar system using the neural network determined in the flow of FIG. 14.

FIG. 15 is a flowchart of an embodiment for the operation of an automatic target recognition process performed on a satellite or similar system, such as a drone, using the neural network determined in the flow of FIG. 14. At step 1501, the hardware is configured, corresponding to step 1309 of FIG. 13, such as being synthesized on a FPGA based on the VHDL description from step 1429. For example, step 1501 can include configuration a FPGA as the embodiment illustrated FIG. 11. For a satellite implementation, step 1501 can be performed prior to launch or after the satellite has been launched. For example, for an on-orbit satellite 10, the satellite can receive the instructions through antenna 217 to program an unused FPGA on the satellite 10 for automatic target recognition. In some embodiments, the programming of the automatic target recognition FPGA could be updated, or another FPGA could be repurposed for automatic target recognition by instructions received by way of antenna 217. The quantized weight values from step 1427 are loaded into the weight memory 1105 at step 1503, where step 1503 can also be performed prior to launch or after launch. For example, an on-orbit satellite 10 can receive the quantized weight values at step 1503 by way of antenna 217, with these then dynamically loaded, as illustrated by the ATR Dynamic Load input of FIG. 11, into the weight memory 1105. In some embodiment, the weight values can also be updated in this way if, for example, more accurate weight values are determined in a subsequent training process, such as based on updated, or different, training images. For example, if it becomes important to recognize a new class of objects, new quantized weight values can be determined and transmitted to the satellite. Once the hardware is configured and the weights are loaded, the automatic target recognition system illustrated in FIG. 11 can begin operating.

Referring to FIGS. 5 and 11, in step 1505 the image is received by the optics 501 and transmitted to the image sensor, such as collected in a raster scan format, where it is turned into pixel values. The incoming image data is broken down into pixel image chips at step 1507. The pixel image chip size (e.g., 16×16 or 24×24) is determined as described above with respect to FIG. 14 and the number of pixel image chips (and number of processing nodes configured at step 1501), N, will correspond to the number of pixels in a complete image divided by the number of pixels in an image chip and will be on the order of a thousand or few thousand, for example. Depending on the embodiment, the pixel image chips can be accumulated in the image chip buffer 1101, or streamed directly to the broadcaster 1109 with little or no buffering to further reduce memory requirements. The inferencing operation for automatic target recognition (or, more generally, image recognition) is then performed using the pixel image chip data as stored in the image chip buffer as input.

At step 1509 the broadcaster 1109 provides the pixel image chip values (from image chip buffer 1101 or streamed directly), the weight values from weight memory 1105, and instructions from the micro sequencer 1107 to the corresponding processing nodes 1111 over the broadcast bus, where the micro sequencer 1107 works in conjunction with the broadcaster 1109 to handle interleaving image pixel input with instruction broadcasting. The system can be implemented using a small set of RISC (reduced instruction set computer) processor instructions, where the instruction set can be further reduced by eliminating instruction not needed for CNN application. Each input pixel image chip can then be propagated through the CNN layers of the corresponding processor node 1111 in parallel at step 1511. The output of the parallel processing pipeline of the processing nodes 1111 is an intermediate state of the CNN, with the intermediate inputs combined at step 1513 for one or more shared final layers, such as the shared softmax 1113 and activation 1115 layers. Step 1515 checks the result of inference operation for target recognition, or more generally image identification, and, if a target is recognized, the result if provide at step 1517. Whether or not a target is recognized at step 1515, the flow can loop back step 1505 to continue processing the received images as long as the automatic target recognition continues.

Although more generally applicable, the example embodiments described here for the automatic target recognition hardware are FPGA based. Considering steps 1509, 1511, and 1513 of FIG. 15 further, the FPGA automatic target recognition system of FIG. 11 is implemented using a batch parallel architecture where a batch of N image chips (of size X by Y) are processed in parallel using a series of single instructions broadcast to the processing array (Single Instruction Multiple Data (SIMD)). Performance is achieved by maximizing the number of processing nodes, N, and minimizing the number of instructions (the size of the CNN). For programs that have a significant number of calculations compared to the amount of Input Output (IO), the SIMD architecture achieves near linear speedup for a linear increase in N. This means that the performance of the implementation is not required to exploit parallelism internal to a given CNN; rather, the CNN is decomposed into a fully sequential implementation by unrolling all loops within the algorithm and only the overall size of the CNN (number of computations) affects performance. For the resulting architecture, performance critical blocks are the instruction broadcaster 1109 and the processing nodes 1111.

The instruction broadcaster constructs instructions for the array of N processing nodes 1111. High performance is achieved when instructions can be presented to the array of processing nodes every clock cycle and each processing node 1111 executes the instruction within the same clock. For the processing nodes 1111, the total number drives performance so that keeping them as smaller is important and minimizing their IO enables creation of large arrays operating at high clock frequencies. The micro sequencer block 1107 works in conjunction with the broadcaster 1109 to handle interleaving image pixel input with instruction broadcasting. The instruction decoding is arranged to avoid duplication of weight storage for the CNN program by keeping a single copy and merging them into the broadcast instruction when appropriate. Each processing node 1111 includes the local temporary value memory T RAM is required. The size of the T RAM will place a limit on the size and organization of the CNN that the array of processing nodes can implement. In the embodiment of FIG. 11, the intermediate results from the CNN of each of the individual processing nodes are a small set supplied for a softmax operation of shared softmax 1113 or a single value targeting a sigmoid shared sigmoid 1115. The throughput requirements of the softmax and sigmoid are relatively insignificant compared to the input pixels and overall time spent in computation that a single implementation can be shared even for very large arrays of processing nodes.

The computation block of a processing node 1111 is implemented using Reduced Instruction Set Computer (RISC) techniques, namely a simple instruction set, heavy use of pipelining, and compiler handling of data hazards. The "Reduced" approach to the instruction set can be taken further with the processing node hardware by only implementing instructions that enable the CNN layers of: Convolution, Max Pooling, and Averaging using quantized 8-bit values. In one embodiment, the state of the machine is represented by 3 elements: Multiply Accumulator (MAC), Maximum Calculator (MAX), and Block Random Access Memory (BRAM). The MAC is a single register that can accept two values that are multiplied then either loaded into or added to the current accumulator register. The source of the MAC input values can be a value from T RAM, a constant from the instruction, or the least significant bits of the MAC Accumulator itself. The MAX is a single register which can be either loaded with a value or updated to take the maximum of a value and its current value. Like the MAC, the inputs for the MAX are loaded from T RAM. The T RAM serves as an array values, storing temporary results and supporting IO with the broadcast bus. In one embodiment, all instructions can operate on these 3 machine state elements, loading values from BRAM, performing arithmetic using the MAC and MAX and storing results back to BRAM.

The broadcast bus can be used to create a processing array of individual process node 1111 machines provide a uniform way to handle IO and transmitting instructions to all processing nodes to implement a parallel calculation. The structure must be amenable to the FPGA architecture since the size of the arrays may be on the order of 1000 nodes, which could overwhelm the FPGA routing resources if not properly implemented. In one embodiment, a giant shift register approach is mapped to the FPGA and snaked up and down columns within the device and easily pipelined to achieve high clock frequencies. Each processing node 1111 can monitors its segment of the shift register and accept passing operations that target it, passing on ones that don't, and transforming operations to result outputs when commanded.

The ability of the micro sequencer block 1107 to work in conjunction with the broadcaster 1109 to interleave IO with computation is a task of managing the local memory T RAM for each processing node 1111. In one embodiment, a compiler can allocate a staging buffer at the end of the T RAM on each array processing node 1111. Using "TAKE" commands the bus master can send input pixels to these memory buffers as pixels arrive. When a pixel load is happening, no computation is performed that clock cycle. Once a previous computation has finished and the staging buffers are all loaded with data to process the next iteration, instructions can be sent by an "ALL" command to the processing nodes 1111 to copy the data to the primary buffer region (typically the beginning of memory), then start the computation and interleaving the next round of input data loading into the now free staging buffers. Performing the buffer copy from staging to primary can be performed on all array nodes in parallel ("ALL" bus commands) and is therefore very efficient. Using an interleaved IO strategy in the architecture minimizes the input buffers and avoids requiring high-rate data load bursts in order to efficiently load data.

Figure 16:
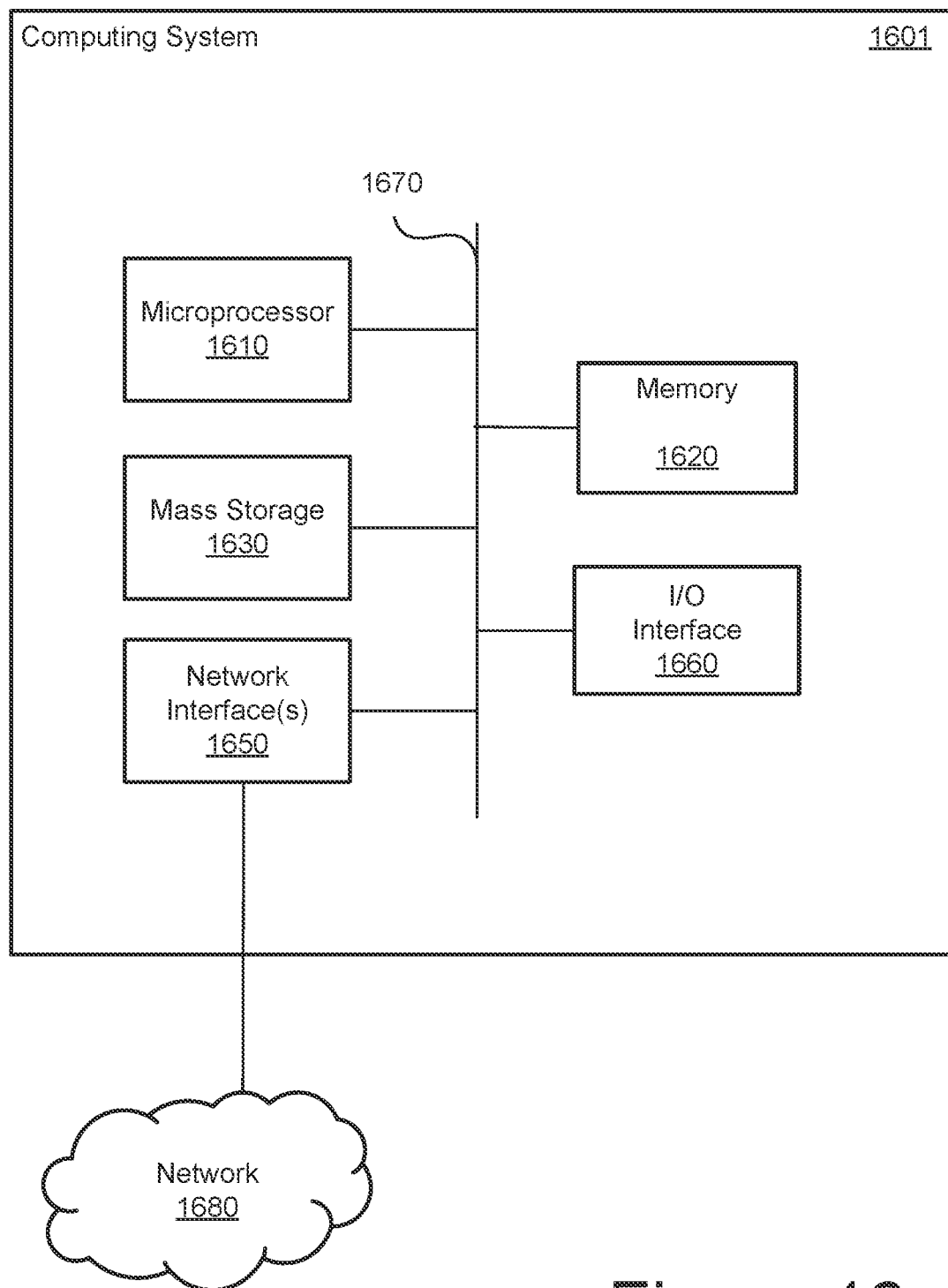
FIG. 16 is a high-level block diagram of a computing system that can be used to implement various embodiments of the quantization aware network training process of FIG. 14.

FIG. 16 is a high-level block diagram of a computing system that can be used to implement various embodiments of the quantization aware network training process of FIG. 14. In one example, computing system 1601 is a network system. Specific devices may utilize all of the components shown, or only a subset of the components, and levels of integration may vary from device to device. Furthermore, a device may contain multiple instances of a component, such as multiple processing units, processors, memories, interfaces, etc. In one set of embodiments, the computing system 1601 can be implemented as a part of a cloud computing platform.

The network system may comprise a computing system 1601 equipped with one or more input/output devices, such as network interfaces, storage interfaces, and the like. The computing system 1601 may include: a central processing unit or units (CPU), graphical processing units (GPU), tensor processing units (TPU), and/or other types of processors for microprocessor 1610; a memory 1620; a mass storage device 1630; and an I/O interface 1660 connected to a bus 1670. The computing system 1601 is configured to connect to various input and output devices (keyboards, displays, etc.) through the I/O interface 1660. In the process of FIG. 14, in some embodiments the I/O interface 1660 can be used to provide one or both of the capacity and processing capability of the hardware at steps 1401 and 1403, with the computing system 1601 then computing one or both of the image chip size or network structure at steps 1405 and 1407. In some embodiment, one or both of step 1401 and 1403 can be performed separately from the computing system, with the results of one or both of steps 1405 and 1407 then being provided over the I/O interface 1660. The bus 1670 may be one or more of any type of several bus architectures including a memory bus or memory controller, a peripheral bus or the like.

The microprocessor 1610 may comprise any type of electronic data processor and be configured to implement any of the techniques described herein with respect to the flowchart of FIG. 14, using any one or combination of steps described in the embodiments. The memory 1620 may comprise any type of system memory such as static random access memory (SRAM), dynamic random access memory (DRAM), synchronous DRAM (SDRAM), read-only memory (ROM), a combination thereof, or the like. In an embodiment, the memory 1620 may include ROM for use at boot-up, and DRAM for program and data storage for use while executing programs.

The mass storage device 1630 may comprise any type of storage device configured to store data, programs, and other information and to make the data, programs, and other information accessible via the bus 1670. The mass storage device 1630 may comprise, for example, one or more of a solid-state drive, hard disk drive, a magnetic disk drive, an optical disk drive, or the like.

The computing system 1601 also includes one or more network interfaces 1650, which may comprise wired links, such as an Ethernet cable or the like, and/or wireless links to access nodes or one or more networks 1680. The network interface 1650 allows the computing system 1601 to communicate with remote units via the network 1680. For example, the network interface 1650 may provide wireless communication via one or more transmitters/transmit antennas and one or more receivers/receive antennas. In an embodiment, the computing system 1601 is coupled to a local-area network or a wide-area network for data processing and communications with remote devices, such as other processing units, the Internet, remote storage facilities, or the like. In one embodiment, the network interface 1650 may be used to receive and/or transmit interest packets and/or data packets in an ICN.

The components depicted in the computing system of FIG. 16 are those typically found in computing systems suitable for use with the technology described herein, and are intended to represent a broad category of such computer components that are well known in the art. Many different bus configurations, network platforms, and operating systems can be used.

One embodiment includes a method that includes: receiving data on available memory capacity of a target recognition system; receiving data on available processing capability of the target recognition system; receiving training image data for a two dimensional array of pixel values; and determining a neural network to perform image identification on the target recognition system. Determining the neural network to perform image identification on the target recognition system includes: determining from one or both of the available memory capacity of the target recognition system and the available processing capability of the target recognition system a number N of a plurality of subsets of the two dimensional array of pixel values, each of the subsets comprising pixel values of a plurality of contiguous pixel locations; determining from one or both of the available memory capacity of the target recognition system and the available processing capability of the target recognition system a network structure of N processing nodes, each including a neural network of a plurality of layers that is configured to process a corresponding one of the subsets of pixel values; separating the training image data into the plurality of subsets of pixel values for the training image data; and performing a training operation to determine a set of weight values for the neural network of each of the processing nodes using the corresponding subset of pixel values for the training image data.

One embodiment includes a system, comprising one or more interfaces and one or more processors connected to the one or more interfaces. The one or more interfaces are configured to: receive training image data for a two dimensional array of pixel values; receive a number N of a plurality of subsets of a two dimensional array of pixel values, each of the subsets comprising pixel values of a plurality of contiguous pixel locations; and receive a convolutional neural network (CNN) structure of a plurality of layers that is configured to process an input corresponding one of the subsets of pixel values. The one or more processors are configured to: determine a neural network for a target recognition system that is configured to perform image identification on an image from the two dimensional array of pixel values, the neural network comprising N processing nodes each configured to process in parallel by the CNN of a corresponding one of the subsets of pixel values; separate the training image data into the plurality of subsets of pixel values for the training image data; and perform a training operation to determine a set of weight values for the CNN of each of the processing nodes using the corresponding subset of pixel values for the training image data.

One embodiment includes a method including: receiving data on one or both of an available memory capacity and an available processing capability of a field programmable gate array (FPGA); receiving training image data for a two dimensional array of pixel values; determining from one or both of the available memory capacity and the available processing capability of the FPGA a number N of a plurality of subsets of the two dimensional array of pixel values, each of the subsets comprising pixel values of a plurality of contiguous pixel locations; determining from one or both of the available memory capacity and the available processing capability of the FPGA a convolutional neural network (CNN) structure of a plurality of layers that is configured to process an input corresponding one of the subsets of pixel values; determine a neural network for a target recognition system implemented on the FPGA that is configured to perform image identification on an image from the two dimensional array of pixel values, the neural network comprising N processing nodes each configured to process in parallel by the CNN of a corresponding one of the subsets of pixel values; separating the training image data into the plurality of subsets of pixel values for the training image data; and performing a training operation to determine a set of weight values for the CNN of each of the processing nodes using the corresponding subset of pixel values for the training image data.

One embodiment includes a spacecraft satellite including an image sensor configured to generate image data of a two dimensional array of pixel values and an automatic target recognition circuit configured to receive the image data. The automatic target recognition circuit configured comprises: a plurality of N processing nodes each configured to apply a convolutional neural network (CNN) to a subset of pixels values of the image data received from the image sensor; and one or more control circuits. The one or more control circuits are configured to: receive the image data from the image sensor; separate the image data into a plurality of N subsets of the image data, each of the subsets comprising pixel values of a plurality of contiguous pixel locations; process each of the N subsets of the image data in a corresponding one of the processing nodes by applying the processing node's CNN to the corresponding subset of image data; and determine whether a target is recognized based upon a combined result of processing the each of the N subsets of the image data in a corresponding one of the processing nodes.

One embodiment includes a method comprising receiving instructions for configuring a field programmable gate array (FPGA) as an automatic target recognition circuit and configuring the FPGA according to the instructions to include: a memory; and a plurality of N processing nodes each configured to apply a convolutional neural network (CNN) to image data. The method also includes: receiving weight values for the CNNs; storing the weight values in the memory; subsequent to configuring the FPGA and storing the weight values; receiving image data from a two dimensional array of pixel values, separating the image data into a plurality of N subsets of the image data, each of the subsets comprising pixel values of a plurality of contiguous pixel locations; processing in parallel each of the N subsets of the image data in a corresponding one of the processing nodes by applying the processing node's CNN using the stored weight values to the corresponding subset of image data; and determining whether a target is recognized based upon a combined result of processing the each of the N subsets of the image data in a corresponding one of the processing nodes.

One embodiment includes an apparatus including: a memory; a plurality of N processing nodes each configured to apply a convolutional neural network (CNN) to image data; one or more shared neural network layers; and one or more control circuits. The one or more control circuits are configured to: receive weight values for the CNNs; store the weight values in the memory; receive image data from a two dimensional array of pixel values; separate the image data into a plurality of N subsets of the image data, each of the subsets comprising pixel values of a plurality of contiguous pixel locations; process in parallel each of the N subsets of the image data in a corresponding one of the processing nodes by applying the processing node's CNN using the stored weight values to the corresponding subset of image data to generate N intermediate results; receive the N intermediate results as input to the one or more shared neural network layers; and determine whether a target is recognized based upon an output of the share neural network layers.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A satellite, comprising:
an image sensor configured to generate image data of a two dimensional array of pixel values; and
an automatic target recognition circuit configured to receive the image data and comprising:
a plurality of N processing nodes each configured to apply a convolutional neural network (CNN) to a subset of pixels values of the image data received from the image sensor; and
one or more control circuits configured to:
receive the image data from the image sensor;
separate the image data into a plurality of N non-overlapping subsets of the image data, each of the subsets comprising pixel values of a plurality of contiguous pixel locations, the combined pixel locations of the N subsets containing all pixel locations of the image data;
process in parallel each of the N subsets of the image data in a corresponding one of the processing nodes by applying the processing node's CNN to the corresponding subset of the image data;
combine results of the processing of each of the N subsets of the image data in a corresponding one of the processing nodes to obtain a combined output for the image data; and
determine whether a target is recognized based upon the combined output for the image data.

2. The satellite of claim 1, wherein the automatic target recognition circuit is a field programmable gate array.

3. The satellite of claim 2, further comprising:
an antenna configured to receive instructions to configure the field programmable gate array while the satellite is on-orbit,
and wherein the one or more control circuits configured to:
configure the field programmable gate array according to the instructions.

4. The satellite of claim 1, wherein receiving the image data from the image sensor comprises streaming the subsets of image data.

5. The satellite of claim 1, wherein the automatic target recognition circuit further comprises:
a buffer memory configured to store the separated the image data.

6. The satellite of claim 1, wherein the one or more control circuits include:
a broadcaster configured to transmit to each of the subsets of the image data to a corresponding processing node.

7. The satellite of claim 6, wherein the one or more control circuits include:

a micro sequencer configured to coordinate with the broadcaster the transmission of the subsets of the image data and instructions to the processing nodes.

8. The satellite of claim 7, wherein the broadcaster and the micro sequencer are configured to interleave the broadcast of the subsets of the image data and the instructions to the processing nodes.

9. The satellite of claim 1, wherein the automatic target recognition circuit further comprises:
a memory configured to store weight values for the CNNs.

10. The satellite of claim 9, wherein the weight values are quantized values.

11. The satellite of claim 9, further comprising:
an antenna configured to receive the weight values while the satellite is on-orbit,
and wherein the one or more control circuits configured to:
store the received weight values in the memory.

12. The satellite of claim 11, wherein storing the received weight values in the memory includes updating previously stored weight values.

13. The satellite of claim 1, wherein each of the processing nodes has a corresponding random access memory configured to store intermediate computational values when applying the CNN to the corresponding subset of pixels values of the image data.

14. The satellite of claim 1, wherein each of the N processing nodes is configured to determine a corresponding intermediate result, the automatic target recognition circuit further comprising:
one or more shared CNN layers configured to receive the N intermediate results as input and determine a target recognition result from a combination of the N intermediate results.

15. The satellite of claim 14, wherein the one or more shared layers include a softmax layer.

16. The satellite of claim 14, wherein the one or more shared layers include a sigmoid layer.

17. The satellite of claim 1, wherein each of the subsets of pixel values correspond to an M by M square of contiguous pixel locations, where M is an integer greater than 1.

18. The satellite of claim 17, wherein the digital sensor is a panchromatic sensor.

19. A method, comprising:
receiving instructions for configuring a field programmable gate array (FPGA) as an automatic target recognition circuit;
configuring the FPGA according to the instructions to include:
a memory; and
a plurality of N processing nodes each configured to apply a convolutional neural network (CNN) to image data;
receiving weight values for the CNNs;
storing the weight values in the memory;
subsequent to configuring the FPGA and storing the weight values, receiving image data from a two dimensional array of pixel values;
separating the image data into a plurality of N non-overlapping subsets of the image data, each of the subsets comprising pixel values of a plurality of contiguous pixel locations, the combined pixel locations of the N subsets containing all pixel locations of the image data;
processing in parallel each of the N subsets of the image data in a corresponding one of the processing nodes by applying the processing node's CNN using the stored weight values to the corresponding subset of image data;
combining results of the processing of each of the N subsets of the image data in a corresponding one of the processing nodes to obtain a combined output for the image data; and
determining whether a target is recognized based upon the combined output for the image data.

20. An apparatus, comprising:
a memory;
a plurality of N processing nodes each configured to apply a corresponding convolutional neural network (CNN) to image data;
one or more shared neural network layers; and
one or more control circuits configured to:
receive weight values for the CNNs;
store the weight values in the memory;
receive image data from a two dimensional array of pixel values;
separate the image data into a plurality of N non-overlapping subsets of the image data, each of the subsets comprising pixel values of a plurality of contiguous pixel locations, the combined pixel locations of the N subsets containing all pixel locations of the image data;
process in parallel each of the N subsets of the image data in a corresponding one of the processing nodes by applying the processing node's CNN using the stored weight values to the corresponding subset of image data to generate N intermediate results;
receive the N intermediate results as input to the one or more shared neural network layers;
combine results of the processing of each of the N subsets of the image data in a corresponding one of the processing nodes to obtain a combined output for the image data; and
determine whether a target is recognized based upon the combined output for the image data.

21. The method of claim 19, further comprising prior to configuring the FPGA:
selecting the value of N and the number of pixels in the non-overlapping subsets;
determining an accuracy of the CNN using the selected value of N and selected number of pixels in the non-overlapping subsets; and
based on the determined accuracy, adjusting the selected value of N and selected number of pixels in the non-overlapping subsets.

* * * * *